United States Patent
Zhou

(10) Patent No.: US 11,533,686 B2
(45) Date of Patent: Dec. 20, 2022

(54) METHOD AND DEVICE FOR CONTROLLING UPLINK TRANSMISSION POWER, BASE STATION AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 67 days.

(21) Appl. No.: 17/059,424

(22) PCT Filed: May 31, 2018

(86) PCT No.: PCT/CN2018/089401
§ 371 (c)(1),
(2) Date: Nov. 27, 2020

(87) PCT Pub. No.: WO2019/227444
PCT Pub. Date: Dec. 5, 2019

(65) Prior Publication Data
US 2021/0160787 A1  May 27, 2021

(51) Int. Cl.
*H04W 52/18* (2009.01)
*H04W 52/14* (2009.01)
(Continued)

(52) U.S. Cl.
CPC ......... *H04W 52/146* (2013.01); *H04L 1/0003* (2013.01); *H04W 8/24* (2013.01);
(Continued)

(58) Field of Classification Search
CPC ..... H04W 52/18; H04W 52/34; H04W 52/38; H04W 52/04; H04W 52/00; H04W 52/08; H04W 76/27
See application file for complete search history.

(56) References Cited

U.S. PATENT DOCUMENTS 8,565,205 B2  10/2013  Ho
8,781,437 B2   7/2014  Ngai
(Continued)

FOREIGN PATENT DOCUMENTS

CN   103270797 A   8/2013
CN   103703840 A   4/2014
(Continued)

OTHER PUBLICATIONS

LG Electronics:"Further consideration on HPUE in 3.5 GHz range", 3GPP Draft; R4-1709530 (HPUE), 3rdGeneration PartnershipProject(3GPP)Mobile CompetenceCentre650, Route DesluciolesF-06921 Sophia-Antipolis Cedex; France.. vol. RAN WG4, nosNagoya, Japan; Sep. 18, 2017Sep. 21, 2017Sep. 11, 2017(Sep. 11, 2017), pp. 1-2, XP051331600, Retrieved from the Internet:URL: http://www._3gpp.org/ftp/tsg_ran/WG4_Radio/TSGR4_AHs/TSGR4_NR_Sep2017/Docs/[retrieved on Sep. 11, 2017.
(Continued)

*Primary Examiner* — Tu X Nguyen
(74) *Attorney, Agent, or Firm* — Syncoda LLC; Feng Ma

(57) ABSTRACT

A method for controlling uplink transmission includes: determining an uplink resource ratio of user equipment in a preset high-power mode; determining power adjustment information if the uplink resource ratio is greater than or equal to a preset uplink proportion threshold corresponding to the preset high-power mode; and sending the uplink resource ratio and the power adjustment information to the user equipment such that the user equipment, when transmitting uplink information according to the uplink resource ratio in the preset high-power mode, controls the uplink transmission power according to the power adjustment information.

15 Claims, 13 Drawing Sheets

(51) Int. Cl.
*H04L 1/00* (2006.01)
*H04W 8/24* (2009.01)
*H04W 52/08* (2009.01)
*H04W 52/36* (2009.01)

(52) U.S. Cl.
CPC ......... *H04W 52/08* (2013.01); *H04W 52/365* (2013.01); *H04W 52/367* (2013.01)

(56) References Cited

U.S. PATENT DOCUMENTS

| | | | |
|---|---|---|---|
| 2012/0147801 A1 | 6/2012 | Ho | |
| 2012/0270519 A1 | 10/2012 | Ngai | |
| 2015/0011236 A1* | 1/2015 | Kazmi | H04W 52/365 455/456.1 |
| 2017/0332333 A1 | 11/2017 | Santhanam et al. | |

FOREIGN PATENT DOCUMENTS

| | | |
|---|---|---|
| CN | 107231682 A | 10/2017 |
| CN | 108702761 A | 10/2018 |
| WO | 2015047766 A1 | 4/2015 |
| WO | 2017196612 A1 | 11/2017 |

OTHER PUBLICATIONS

CMCC:"Discussion on solutions to satisfy SAR requirements for NR HPUE" CMCC:3GPP Draft; R4-1804016, 3rd GenerationPartnership Project (3GPP), MobileCompetence Centre ; 650, Route Deslucioles: F-06921 Sophia-Antipolis CedexiFrancevol. RAN WG4,No. Melbourne, AU; Apr. 16, 2018Apr. 20, 2018 Apr. 15 2018 (Apr. 15 2018), XP051430932, Retrieved from the Internet: URL:http://www.3gpp.org/ftp/Meetings85F3GPP%5FSYNC/RAN4/Docs/ [retrieved on Apr. 15 2018] p. 1*.
Supplementary European Search Report in the European application No. 18920238.5, dated Jan. 4, 2022.
Notice of Allowance of the Chinese application No. 201880000742.0, dated Jun. 3, 2021.
International Search Report in the international application No. PCT/CN2018/089401, dated Jan. 25, 2019.
English translation of the Written Opinion of the International Search Authority in the international application No. PCT/CN2018/089401, dated Jan. 25, 2019.
First Office Action of the Chinese application No. 201880000742.0, dated Sep. 25, 2020.
3GPP TSG-RAN WG4 Meeting #87, R4-1806818, OPPO, "More on HPUE behavior", mailed on May 25, 2018.
TSG-RAN Working Group 4 (Radio) meeting #87, R4-1806725, Ericsson, "Configured output power for EN-DC", mailed on May 25, 2018.
3GPP TSG-RAN WG4 Meeting#86bis, R4-1804074, vivo, "Discussion on NR FR1 HPUE behaviour", mailed on Apr. 20, 2018.

* cited by examiner

METHOD AND DEVICE FOR CONTROLLING UPLINK TRANSMISSION POWER, BASE STATION AND USER EQUIPMENT

CROSS-REFERENCE TO RELATED APPLICATIONS

This application is a U.S. national stage of International Application No. PCT/CN2018/089401 filed on May 31, 2018, the disclosure of which is hereby incorporated by reference in its entirety.

TECHNICAL FIELD

The present disclosure relates to the technical field of communications, and more particularly, to a method and device for controlling uplink transmission power, a base station and user equipment (UE).

BACKGROUND

When 5G new radio (NR) and long-term evolution (LTE) are deployed, uplink transmission power of UE is classified based on a power class. For example, the power class 3 is 23 dBm, which is the typical uplink transmission power of the UE. In some application scenarios, for example, when the UE operates in higher frequency bands such as 3.5 GHz and the like, in order to ensure the increase of uplink coverage, the UE needs to have higher uplink transmission power such as 26 dBm, that is, the power class 2. The UE in a preset high-power class mode for transmission is called high-power UE (HPUE).

Since the transmission power of the UE in a preset high transmission power mode is large, when a base station allocates resources for the UE in an HPUE mode, a configured uplink and downlink resource ratio is not appropriate, wireless signal radiation of the UE in the HPUE mode will exceed a standard specific absorption rate (SAR), which causes harm to human body.

SUMMARY

In order to overcome the problems in related technologies, embodiments of the present disclosure provide a method and device for controlling uplink transmission power, a base station and UE, such that when the UE uses a higher uplink resource ratio to transmit uplink information in an HPUE mode, exceeding a standard SAR is avoided by controlling uplink transmission power of the HPUE.

According to a first aspect of embodiments of the present disclosure, there is also provided a method for controlling uplink transmission power, which is applied to a base station and may include: an uplink resource ratio of UE in a preset high-power mode is determined; in response to the uplink resource ratio being greater than or equal to a preset uplink proportion threshold corresponding to the preset high-power mode, power adjustment information is determined; the uplink resource ratio and the power adjustment information are sent to the UE so that the UE controls uplink transmission power according to the power adjustment information in transmitting uplink information according to the uplink resource ratio in the preset high-power mode.

Optionally, the operation that the uplink resource ratio of the UE in the preset high-power mode is determined may include: it is determined whether the UE supports a preset power adjustment function, the preset power adjustment function being configured to avoid exceeding a standard SAR by adjusting the uplink transmission power in response to the uplink resource ratio exceeding the preset uplink proportion threshold corresponding to the preset high-power mode; and in response to the UE supporting the preset power adjustment function, the uplink resource ratio is determined according to a first uplink proportion threshold corresponding to the preset high-power mode. The first uplink proportion threshold may be an uplink proportion threshold corresponding to an upper limit value of SAR.

Optionally, the operation that it is determined whether the UE supports the preset power adjustment function may include: power control capability information of the UE is acquired; and it is determined whether the UE supports the preset power adjustment function according to the power control capability information.

Optionally, the operation that the power control capability information of the UE is acquired may include: the power control capability information reported by the UE is received.

The power control capability information may include at least one of: a capability indicator indicating whether the preset power adjustment function is supported, or the preset uplink proportion threshold corresponding to the preset high-power mode.

Optionally, the operation that the uplink resource ratio is determined according to the first uplink proportion threshold corresponding to the preset high-power mode may include: a power margin is determined according to maximum transmission power of the UE in the preset high-power mode; a configurable maximum uplink proportion is determined based on the power margin; and an uplink proportion higher than the first uplink proportion threshold is determined as the uplink resource ratio. The uplink resource ratio may not exceed the maximum uplink proportion.

Optionally, the operation that the power adjustment information is determined may include: the uplink transmission power corresponding to the uplink resource ratio is reduced according to preset strategies, and a power adjustment result is obtained; and the power adjustment information is determined according to the power adjustment result.

Optionally, the preset strategies include at least one of: reducing maximum transmission power corresponding to the preset high-power mode; reducing nominal power corresponding to the preset high-power mode; reducing a path compensation value of a cell; reducing a modulation and coding scheme (MCS) adjustment value determined by an MCS and a data type; or reducing an adjustment value formed by closed-loop power control of the UE.

Optionally, the operation of reducing the maximum transmission power corresponding to the preset high-power mode may include: the maximum transmission power corresponding to the preset high-power mode is reduced according to an adjustment value determined by a preset maximum power reduction (MPR).

Optionally, the operation that the uplink transmission power corresponding to the uplink resource ratio is reduced according to the preset strategies and the power adjustment result is obtained may include: an original transmission power value corresponding to the preset high-power mode is determined, the original transmission power value being preset uplink transmission power determined in response to the uplink resource ratio being less than the preset uplink proportion threshold; and a power adjustment value corresponding to the uplink resource ratio is determined according to a difference value between the uplink resource ratio and the preset uplink proportion threshold, the power adjustment value being configured to reduce the uplink transmission power based on the original transmission power value.

The operation that the power adjustment information is determined according to the power adjustment result may include: the power adjustment information is determined based on the original transmission power value and the power adjustment value.

Optionally, the power adjustment value may include: a power reduction of target uplink transmission power relative to the original transmission power value; or a power adjustment factor for reducing the uplink transmission power.

Optionally, the operation that the power adjustment value corresponding to the uplink resource ratio is determined according to the difference value between the uplink resource ratio and the preset uplink proportion threshold may include: the difference value between the uplink resource ratio and the preset uplink proportion threshold is determined; and a preset power control list is queried according to the difference value to obtain the power adjustment value corresponding to the difference value. The preset power control list may include a corresponding relationship between a range of the difference value and the power adjustment value.

Optionally, in response to the preset uplink proportion threshold being less than a first uplink proportion threshold, the first uplink proportion threshold may be an uplink proportion threshold corresponding to an upper limit value of SAR.

The operation that the power adjustment value corresponding to the uplink resource ratio is determined may include: it is determined whether the uplink resource ratio is greater than the first uplink proportion threshold; in response to the uplink resource ratio being less than the first uplink proportion threshold, a first adjustment value is determined; and in response to the uplink resource ratio being greater than or equal to the first uplink proportion threshold, a second adjustment value is determined. A power reduction determined by the second adjustment value may not be less than a power reduction determined by the first adjustment value.

Optionally, the power adjustment information may include: an original transmission power value and a power adjustment value.

The operation that the power adjustment information may be sent to the UE may include: the original transmission power value and the power adjustment value are sent to the UE in different time cycles.

According to a second aspect of embodiments of the present disclosure, there is also provided a method for controlling uplink transmission power, which is applied to UE and may include: an uplink resource ratio and power adjustment information in a preset high-power mode which are sent by a base station are received, the uplink resource ratio being higher than a preset uplink proportion threshold; uplink transmission power is controlled according to the power adjustment information in transmitting uplink information according to the uplink resource ratio in the preset high-power mode.

Optionally, the method may further include the following operation.

Power control capability information is reported to the base station. The power control capability information may be configured to indicate whether the UE supports a preset power adjustment function. The preset power adjustment function may be configured to avoid exceeding a standard SAR by adjusting the uplink transmission power in response to the uplink resource ratio exceeding the preset uplink proportion threshold corresponding to the preset high-power mode.

Optionally, the power control capability information may include at least one of: a capability indicator indicating whether the preset power adjustment function is supported, or the preset uplink proportion threshold corresponding to the preset high-power mode.

Optionally, the power adjustment information may include: an original transmission power value and a power adjustment value.

The operation that the uplink transmission power is controlled according to the power adjustment information may include: target uplink transmission power is determined according to the original transmission power value and the power adjustment value; and the uplink information is transmitted according to the target uplink transmission power.

Optionally, the power adjustment value may be a preset power reduction. The operation that the target uplink transmission power is determined may include: the original transmission power value is reduced by the preset power reduction to obtain the target uplink transmission power.

Optionally, the power adjustment value may be a preset power adjustment factor for reducing the uplink transmission power.

The operation that the target uplink transmission power is determined may include: the target uplink transmission power is determined according to the product of the original transmission power value and the preset power adjustment factor.

According to a third aspect of embodiments of the present disclosure, there is also provided a device for controlling uplink transmission power, which is applied to a base station and may include a resource allocation module, an adjustment information determining module and an information sending module.

The resource allocation module may be configured to determine an uplink resource ratio of UE in a preset high-power mode.

The adjustment information determining module may be configured to determine power adjustment information in response to the uplink resource ratio being greater than or equal to a preset uplink proportion threshold corresponding to the preset high-power mode.

The information sending module may be configured to send the uplink resource ratio and the power adjustment information to the UE so that the UE controls uplink transmission power according to the power adjustment information in transmitting uplink information according to the uplink resource ratio in the preset high-power mode.

Optionally, the resource allocation module may include a function determining submodule and a resource ratio determining submodule.

The function determining submodule may be configured to determine whether the UE supports a preset power adjustment function, and the preset power adjustment function is configured to avoid exceeding a standard SAR by adjusting the uplink transmission power in response to the uplink resource ratio exceeding the preset uplink proportion threshold corresponding to the preset high-power mode.

The resource ratio determining submodule may be configured to determine, in response to the UE supporting the preset power adjustment function, the uplink resource ratio according to a first uplink proportion threshold corresponding to the preset high-power mode. The first uplink proportion threshold may be an uplink proportion threshold corresponding to an upper limit value of SAR.

Optionally, the function determining submodule may include a capability information acquiring unit and a function determining unit.

The capability information acquiring unit may be configured to acquire power control capability information of the UE.

The function determining unit may be configured to determine whether the UE supports the preset power adjustment function according to the power control capability information.

Optionally, the capability information acquiring unit may be configured to receive the power control capability information reported by the UE.

The power control capability information may include at least one of: a capability indicator indicating whether the preset power adjustment function is supported, or the preset uplink proportion threshold corresponding to the preset high-power mode.

Optionally, the resource ratio determining submodule may include: a power margin determining unit, an estimating unit and a resource ratio determining unit.

The power margin determining unit may be configured to determine a power margin according to maximum transmission power of the UE in the preset high-power mode.

The estimating unit may be configured to determine a configurable maximum uplink proportion based on the power margin.

The resource ratio determining unit may be configured to determine an uplink proportion higher than the first uplink proportion threshold as the uplink resource ratio. The uplink resource ratio may not exceed the maximum uplink proportion.

Optionally, the adjustment information determining module may include: a power adjusting submodule and an adjustment information determining submodule.

The power adjusting submodule may be configured to reduce the uplink transmission power corresponding to the uplink resource ratio according to preset strategies, and obtain a power adjustment result.

The adjustment information determining submodule may be configured to determine the power adjustment information according to the power adjustment result.

Optionally, the power adjusting submodule may include at least one of: a first adjusting unit, configured to reduce maximum transmission power corresponding to the preset high-power mode; a second adjusting unit, configured to reduce nominal power corresponding to the preset high-power mode; a third adjusting unit, configured to reduce a path compensation value of a cell; a fourth adjusting unit, configured to reduce an MCS adjustment value determined by an MCS and a data type; or a fifth adjusting unit, configured to reduce an adjustment value formed by closed-loop power control of the UE.

Optionally, the first adjusting unit may be configured to reduce the maximum transmission power corresponding to the preset high-power mode according to an adjustment value determined by an MPR.

Optionally, the power adjusting submodule may include: an original power value determining unit and an adjustment value determining unit.

The original power value determining unit may be configured to determine an original transmission power value corresponding to the preset high-power mode. The original transmission power value may be preset uplink transmission power determined in response to the uplink resource ratio being less than the preset uplink proportion threshold.

The adjustment value determining unit may be configured to determine a power adjustment value corresponding to the uplink resource ratio according to a difference value between the uplink resource ratio and the preset uplink proportion threshold. The power adjustment value may be configured to reduce the uplink transmission power based on the original transmission power value.

The adjustment information determining submodule may be configured to determine the power adjustment information based on the original transmission power value and the power adjustment value.

Optionally, the power adjustment value may include: a power reduction of target uplink transmission power relative to the original transmission power value; or a power adjustment factor for reducing the uplink transmission power.

Optionally, the adjustment value determining unit may include: a calculating subunit and a querying subunit.

The calculating subunit may be configured to determine the difference value between the uplink resource ratio and the preset uplink proportion threshold.

The querying subunit may be configured to query a preset power control list according to the difference value to obtain the power adjustment value corresponding to the difference value. The preset power control list may include a corresponding relationship between a range of the difference value and the power adjustment value.

Optionally, in response to the preset uplink proportion threshold being less than a first uplink proportion threshold, the first uplink proportion threshold may be an uplink proportion threshold corresponding to an upper limit value of SAR.

The adjustment value determining unit may include: a comparing subunit, a first adjustment value determining subunit and a second adjustment value determining subunit.

The comparing subunit is configured to determine whether the uplink resource ratio is greater than the first uplink proportion threshold.

The first adjustment value determining subunit is configured to determine a first adjustment value in response to the uplink resource ratio being less than the first uplink proportion threshold.

The second adjustment value determining subunit is configured to determine a second adjustment value in response to the uplink resource ratio being greater than or equal to the first uplink proportion threshold. A power reduction determined by the second adjustment value may not be less than a power reduction determined by the first adjustment value.

Optionally, the power adjustment information may include: an original transmission power value and a power adjustment value.

The information sending module may include: a resource allocation sending submodule and an adjustment information sending submodule.

The adjustment information sending submodule may be configured to send the original transmission power value and the power adjustment value to the UE in different time cycles.

According to a fourth aspect of embodiments of the present disclosure, there is also provided a device for controlling uplink transmission power, which is applied to the UE and may include an information receiving module and a power control module.

The information receiving module may be configured to receive an uplink resource ratio and power adjustment information in a preset high-power mode which are sent by a base station. The uplink resource ratio may be higher than a preset uplink proportion threshold.

The power control module may be configured to control uplink transmission power according to the power adjustment information in transmitting uplink information according to the uplink resource ratio in the preset high-power mode.

Optionally, the device may further include: an information reporting module, configured to report power control capability information to the base station. The power control capability information may be configured to indicate whether the UE supports a preset power adjustment function. The preset power adjustment function may be configured to avoid exceeding a standard SAR by adjusting the uplink transmission power in response to the uplink resource ratio exceeding the preset uplink proportion threshold corresponding to the preset high-power mode.

Optionally, the power control capability information may include at least one of: a capability indicator indicating whether the preset power adjustment function is supported, or the preset uplink proportion threshold corresponding to the preset high-power mode.

Optionally, the power adjustment information received by the information receiving module may include: an original transmission power value and a power adjustment value.

The power control module may include: a target power determining submodule and an uplink information transmitting submodule.

The target power determining submodule may be configured to determine target uplink transmission power according to the original transmission power value and the power adjustment value.

The uplink information transmitting submodule may be configured to transmit the uplink information according to the target uplink transmission power.

Optionally, the power adjustment value may be a preset power reduction.

The target power determining submodule may be configured to reduce the original transmission power value by the preset power reduction to obtain the target uplink transmission power.

Optionally, the power adjustment value may be a preset power adjustment factor for reducing the uplink transmission power.

The target power determining submodule may be configured to determine the target uplink transmission power according to the product of the original transmission power value and the preset power adjustment factor.

According to a fifth aspect of embodiments of the present disclosure, there is also provided a non-transitory computer-readable storage medium, which stores computer instructions. The computer instructions are executed by a processor to perform the steps of any method in the first aspect.

According to a sixth aspect of embodiments of the present disclosure, there is also provided a non-transitory computer-readable storage medium, which stores computer instructions. The computer instructions are executed by a processor to perform the steps of any method in the second aspect.

According a seventh aspect of embodiments of the present disclosure, a base station is provided, which may include: a processor; and a memory configured to store instructions executable by the processor.

The processor is configured to: determine an uplink resource ratio of UE in a preset high-power mode; in response to the uplink resource ratio being greater than or equal to a preset uplink proportion threshold corresponding to the preset high-power mode, determine power adjustment information; and send the uplink resource ratio and the power adjustment information to the UE so that the UE controls uplink transmission power according to the power adjustment information in transmitting uplink information according to the uplink resource ratio in the preset high-power mode.

According an eighth aspect of embodiments of the present disclosure, UE is provided, which may include: a processor; and a memory configured to store instructions executable by the processor.

The processor is configured to: receive an uplink resource ratio and power adjustment information in a preset high-power mode which are sent by a base station, the uplink resource ratio being higher than a preset uplink proportion threshold; and control uplink transmission power according to the power adjustment information in transmitting uplink information according to the uplink resource ratio in the preset high-power mode. The technical solutions provided in the embodiments of the present disclosure may have the following beneficial effects.

In the method for controlling uplink transmission power of the present disclosure, when the uplink resource ratio which is configured for the UE in the preset high-power mode by the base station is greater than or equal to the preset uplink proportion threshold, the corresponding power adjustment information is determined for the uplink resource ratio, such that after being configured in the preset high-power mode, the UE may reduce the uplink transmission power according to the power adjustment information when transmitting the uplink information according to the uplink resource ratio exceeding a standard, thus effectively avoiding exceeding a standard SAR, ensuring that the radiation generated by the UE in the preset high-power transmission mode does not affect the health of end users, and improving the uplink information transmission capability of the UE in the preset high-power transmission mode.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
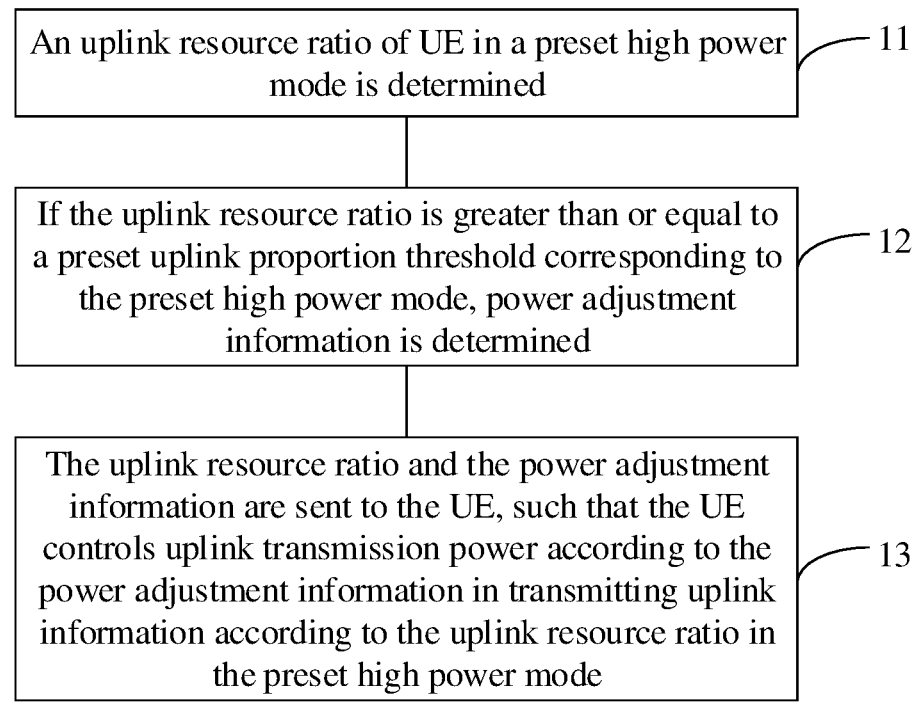
FIG. 1 is a flowchart showing a method for controlling uplink transmission power, according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The execution subjects in the present disclosure include: base stations and UE. The base stations may be base stations and sub-base stations with large-scale antenna arrays. The UE may be user terminals, user nodes, mobile terminals or tablet computers, etc. In a specific implementation process, the base station and the UE are independent and coupled to each other at the same time, so as to jointly implement the technical solutions of the present disclosure.

A method for controlling uplink transmission power of the present disclosure may be applied in an LTE system, a 5G NR system, or a network where the LTE system and the NR system are deployed simultaneously, which is not limited in the present disclosure.

Before the technical solutions of the present disclosure are introduced, the technical terms related to the present disclosure are introduced first.

SAR, measured in watts per kilogram (W/Kg), represents that how much energy is absorbed by unit mass of a human body, and is an indicator in the design of UE to measure the radiation to the human body when the UE transmits a wireless signal. Taking that the UE is a mobile phone, measuring standards for the SAR of the mobile phone vary in different geographic areas. For example, the measuring standard for the SAR of the mobile phone is 1.6 W/Kg in Europe, and the measuring standard for the SAR of the mobile phone is 2.0 W/Kg in America and China. When the mobile phone is used in above geographic areas, it needs to meet the measuring standard for the SAR in each area. For example, the maximum SAR value of the mobile phone operating in any mode in China shall not exceed a preset upper limit value of SAR, that is, 2.0 w/Kg.

The SAR value of the UE is related to uplink transmission power and an uplink proportion in resource allocation. If the UE is configured in a high (transmission) power (HP) mode, namely an HPUE mode, when the uplink proportion in resource allocation information is relatively large, cumulative radiation in unit information transmission time such as a sub-frame may exceed the upper limit value of SAR. The uplink proportion refers to a proportion of a time length corresponding to uplink transmission resources in unit information transmission time when the base station performs resource allocation for the UE, for example, 50%. The above 50% indicates that 50% of time domain resources are configured as the uplink transmission resources in the unit information transmission time.

As for the HP mode, namely the HPUE mode, a 5G NR system may use a method of an LTE system to classify the transmission power of the UE, and use a preset power class value to represent the HP mode of the UE. Taking the LTE system as an example, power class 3 corresponding to the transmission power 23 dBm represents a common power transmission mode, which does not belong to the high-power transmission mode. Power class 2 corresponding to the transmission power 26 dBm represents a high-power transmission mode, and power class 1 and power class 0 represent two high-power transmission modes with higher transmission power. In the 5G NR system, the power classifying manner and the power class value corresponding to the HP mode may vary and should not be interpreted as a limitation to the solutions of the present disclosure.

An application scenario of the technical solutions in the present disclosure may include: for a preset high-power (HPUE) mode of the UE such as power class 2 and the transmission power 26 dBm, if an uplink resource proportion is configured for the UE according to the upper limit value of SAR, for example, 2.0 W/Kg, an uplink transmission throughput requirement cannot be met. For example, there is a problem of large uplink transmission delay. In order to meet the uplink transmission throughput requirement, the base station needs to configure a higher uplink resource ratio for the above UE in the HPUE mode. For example, assuming that in a preset HPUE mode, the maximum uplink resource proportion corresponding to the upper limit value of SAR is 75%, in the present disclosure, in order to meet the uplink transmission throughput requirement, it is necessary to increase the uplink resource proportion of the HPUE mode, for example, to 80% or higher. In this case, if the above UE, after being configured in the preset HPUE mode, still performs uplink transmission according to the uplink transmission power corresponding to the HPUE mode, exceeding a standard SAR happens. In order to avoid exceeding a standard SAR, in the present disclosure, the uplink transmission power in the HPUE mode is reduced to ensure that the HPUE will not exceed SAR in the above scenario. Based on this, the present disclosure provides a method for controlling uplink transmission power.

Referring to FIG. 1 that illustrates a flowchart showing a method for controlling uplink transmission power according to an exemplary embodiment, the method may include the following steps.

In step 11, an uplink resource ratio of UE in a preset high-power mode is determined.

Assuming that the UE is UE1, a base station may configure transmission resources for the UE1 in the preset high-power mode, such as a power class 2 mode, according to radio frequency (RF) transceiver capability of the UE1. The transmission resources include: the transmission resources of uplink information and the transmission resources of downlink information, so as to determine the uplink resource ratio in a basic information transmission unit. Taking an LTE time division duplex (TDD) system as an example, the basic information transmission unit may be a frame, and uplink data and downlink data are transmitted on different sub-frames in the same frame.

In the present disclosure, the uplink resource refers to a physical uplink shared channel (PUSCH) resource, which is mainly configured to bear uplink data transmission.

As described above, when configuring the uplink resource proportion for the HPUE, the base station needs to consider an uplink transmission power value and the upper limit value of SAR in the high-power mode, so as to ensure that the UE will not exceed SAR after being configured in the preset HPUE mode.

Assuming that when the UE1 is in the power class 2 mode, the maximum uplink resource proportion corresponding to the upper limit value of SAR is 75%, then, when the base station performs resource allocation, the configured uplink resource ratio is less than 75%. In another case, corresponding to an application scenario of the present disclosure, for example, in order to meet the uplink transmission throughput requirement, the base station needs to configure the uplink resource proportion of the UE1 in the power class 2 mode to exceed the value of the maximum uplink resource proportion such as 80%. In this case, the base station also needs to configure power adjustment information for the UE1, such that the UE1 reduces, based on an original uplink transmission power value, uplink transmission power according to the power adjustment information after being configured in the preset high-power mode.

Figure 2:
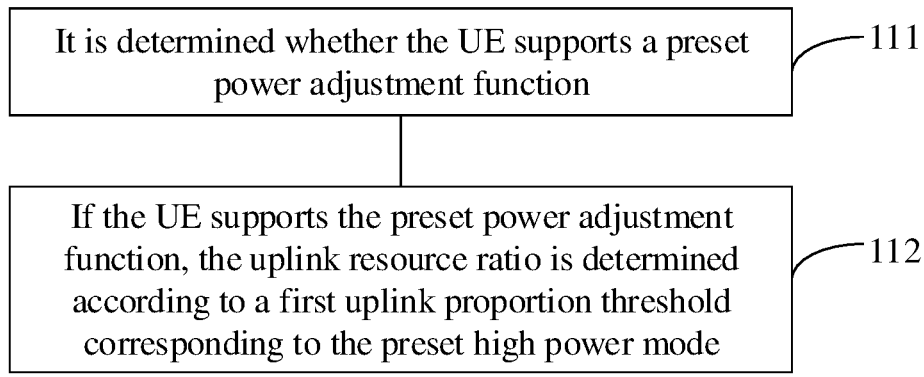
FIG. 2 is a flowchart showing another method for controlling uplink transmission power, according to an exemplary embodiment of the present disclosure.

Whether the latter case can be successfully implemented depends on whether the UE1 supports a function of reducing the uplink transmission power to avoid exceeding a standard SAR in the case of large uplink resource ratio. Considering that some UE cannot support the above function, the base station may first determine whether the UE1 supports the above function before performing resource allocation. Referring to FIG. 2 that illustrates a flowchart showing another method for controlling uplink transmission power according to an exemplary embodiment, the step 11 may include the following steps.

In step 111, it is determined whether the UE supports a preset power adjustment function, and the preset power adjustment function is configured to avoid exceeding a standard SAR by adjusting the uplink transmission power when the uplink resource ratio exceeds a preset uplink proportion threshold corresponding to the preset high-power mode.

In an embodiment of the present disclosure, the base station may determine, based on preset strategies, whether the UE1 supports the preset power adjustment function according to equipment information of the UE1, such as an equipment identification, equipment model or the like reported by the UE1 when accessing to a network. The above preset strategies may include: based on equipment manufacturer information obtained in advance, it is determined that the UE of the same model supports the above function.

In another embodiment of the present disclosure, the base station may also determine whether the UE1 supports the preset power adjustment function based on preset power control capability information reported by the UE1.

Figure 3:
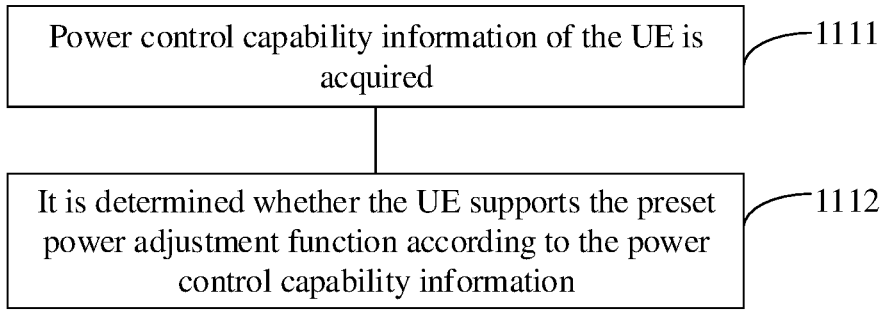
FIG. 3 is a flowchart showing another method for controlling uplink transmission power, according to an exemplary embodiment of the present disclosure.

Referring to FIG. 3 that illustrates a flowchart showing another method for controlling uplink transmission power according to an exemplary embodiment, the step 111 may include the following steps.

In step 1111, power control capability information of the UE is acquired.

In the present disclosure, after accessing to a cell network covered by the base station, the UE1 may report its own power control capability information voluntarily or at the request of the base station. The power control capability information includes indication information indicating whether the UE supports the preset power adjustment function.

In step 1112, it is determined whether the UE supports the preset power adjustment function according to the power control capability information.

In an embodiment of the present disclosure, the UE1 may report the power control capability information through preset uplink control signaling. For example, it is determined whether the UE1 supports the preset power adjustment function through the value of one or more bits preset in the preset uplink control signaling.

In the present disclosure, the power control capability information may include at least one of: a capability indicator indicating whether the preset power adjustment function is supported, or the preset uplink proportion threshold corresponding to the preset high-power mode.

Exemplarily, a preset bit may be configured to bear the indicator. For example, if the bit is set to be 0, it means that the UE1 does not support the preset power adjustment function. Conversely, if the bit is set to be 1, it means that the UE1 supports the preset power adjustment function.

In another embodiment, the base station may also indirectly determine whether the UE1 supports the preset power adjustment function according to whether the UE1 reports the preset uplink proportion threshold corresponding to the preset high-power mode. If the UE1 reports the preset uplink proportion threshold corresponding to the preset high-power mode, such as the preset uplink proportion threshold 70% in the power class 2 mode, the base station may determine that the UE1 supports the preset power adjustment function; conversely, if the UE1 does not report the preset uplink proportion threshold corresponding to the preset high-power mode, for example, multiple bits for bearing the preset uplink proportion threshold corresponding to the HPUE mode in the preset uplink control signaling are all set to be 0, it may be determined that the UE1 does not support the preset power adjustment function.

In another embodiment of the present disclosure, if the preset capability indicator in the power control capability information clearly indicates that the UE1 supports the preset power adjustment function, for example, the preset capability indicator is 1, the power control capability information may also include: the preset uplink proportion threshold corresponding to the preset high-power mode. That is, the UE1 may inform, through the power control capability information, the base station of the threshold that the configured uplink resource ratio reaches or exceeds to trigger the preset power adjustment function in the case that the UE1 is configured in the HPUE mode.

In step 112, if the UE supports the preset power adjustment function, the uplink resource ratio is determined according to a first uplink proportion threshold corresponding to the preset high-power mode. The first uplink proportion threshold is an uplink proportion threshold corresponding to an upper limit value of SAR.

As in the example above, if the base station determines that the UE1 supports the preset power adjustment function, the base station determines that the uplink resource ratio configured for the UE1 according to the uplink transmission requirement in the preset HPUE mode, such as the power class 2 mode, may exceed the first uplink proportion threshold, namely 75%.

It is to be noted here that according to different relationships between the preset uplink proportion threshold and the first uplink proportion threshold, the uplink resource proportion configured for the UE1 in the power class 2 mode by the base station may not exceed 75%.

Figure 4:
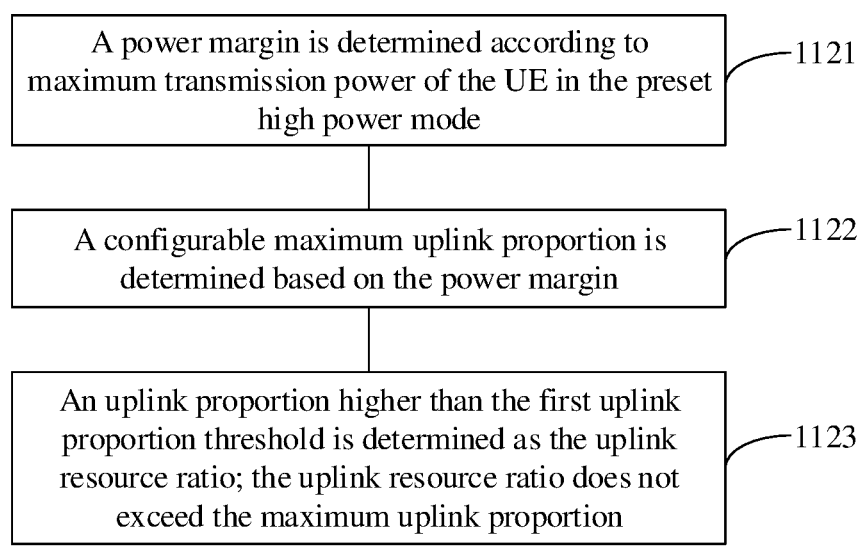
FIG. 4 is a flowchart showing another method for controlling uplink transmission power, according to an exemplary embodiment of the present disclosure.

As for how the base station determines the uplink resource ratio for the UE in the preset high-power mode, and the process of determining the uplink resource ratio in the case that the uplink resource ratio exceeds the first uplink proportion threshold, FIG. 4 that illustrates a flowchart showing another method for controlling uplink transmission power according to an exemplary embodiment can serve as a reference. The step 112 may include the following steps.

In step 1121, a power margin (or called power surplus) is determined according to maximum transmission power of the UE in the preset high-power mode.

The minimum transmission power of a piece of UE in the preset HPUE mode is related to the network coverage of an operator in the cell where the UE is currently located, and is generally a preset value that the operator has been informed of in advance. The base station may acquire the preset value of the minimum transmission power that the operator has been informed of in advance, calculate a difference value between the maximum transmission power and the preset value of the minimum transmission power, and determine the power margin.

In step 1122, a configurable maximum uplink proportion is determined based on the power margin.

In the present disclosure, before determining the uplink resource ratio $R_{UL}$ for the UE1, the base station may determine the configurable maximum value of $R_{UL}$ in advance according to the power margin. The configurable maximum value of $R_{UL}$ may be 100% or less than 100%.

In step 1123, an uplink proportion higher than the first uplink proportion threshold is determined as the uplink resource ratio. The uplink resource ratio does not exceed the maximum uplink proportion.

Exemplarily, if the base station determines that the power margin of the UE1 in the power class 2 mode is 2 dBm, the configurable maximum value of $R_{UL}$ is determined to be 90% according to a preset rule. The value range of the uplink resource proportion $R_{UL}$ that the base station configures for the UE1 in the power class 2 mode is $75\% \leq R_{UL} \leq 90\%$.

In step 12, if the uplink resource ratio is greater than or equal to a preset uplink proportion threshold corresponding to the preset high-power mode, power adjustment information is determined.

In the present disclosure, the base station may determine, according to the preset strategies, the preset uplink proportion threshold that triggers the HPUE to reduce the uplink transmission power. In an embodiment, as described above, the preset uplink proportion threshold may be acquired through the power control capability information reported by the UE.

Still assuming that the preset HPUE mode of the UE1 is the power class 2 mode, if the uplink resource ratio that the base station configures for the UE1 is greater than or equal to the preset uplink proportion threshold, the base station determines the corresponding power adjustment information for the HPUE mode. The power adjustment information is configured to instruct the UE1 in the power class 2 mode to reduce the uplink transmission power when it transmits the uplink information according to the uplink resource ratio configured by the base station.

In an embodiment, the power adjustment information may include: target uplink transmission power P. The target uplink transmission power is less than an original transmission power value P0. The original transmission power value P0 is the uplink transmission power that the base station determines for the UE1 when the uplink resource ratio is less than the preset uplink proportion threshold. Assuming that the preset uplink proportion threshold is 70%, a corresponding relationship between the original transmission power value P0 and the uplink resource ratio $R_{UL}$ may be illustrated in Table 1.

TABLE 1

| Equipment Identification | HPUE mode | Uplink resource ratio $R_{UL}$ | Original transmission power value |
|---|---|---|---|
| UE1 | power class 2 | $R_{UL} < 70\%$ | P0 |

In another embodiment of the present disclosure, the power adjustment information may at least include: a power adjustment value. The power adjustment value is a value configured to reduce the uplink transmission power based on the original power value. The value may be a specific power reduction or a power adjustment factor β for reducing the uplink transmission power, where β is less than 1, and P=β*P0.

Figure 5:
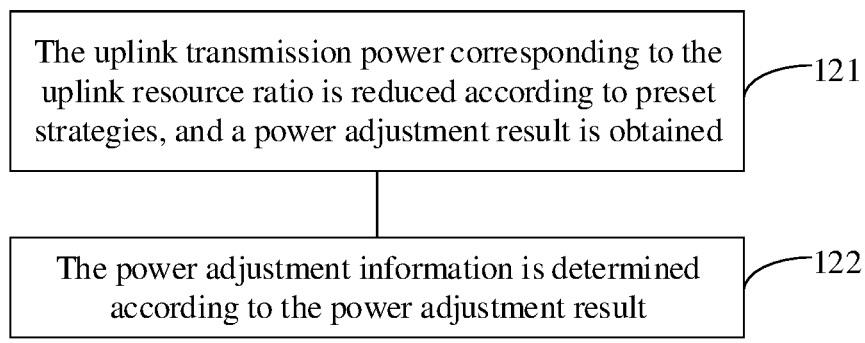
FIG. 5 is a flowchart showing another method for controlling uplink transmission power, according to an exemplary embodiment of the present disclosure.

As for how the base station determines the power adjustment information, FIG. 5 that illustrates a flowchart showing another method for controlling uplink transmission power according to an exemplary embodiment can serve as a reference. The step 12 may include the following steps.

In step 121, the uplink transmission power corresponding to the uplink resource ratio is reduced according to preset strategies, and a power adjustment result is obtained.

In the present disclosure, for the preset high-power mode of the UE, the base station determines the transmission power of a basic information transmission unit, such as a sub-frame, on the PUSCH referring to the maximum transmission power, a nominal power, a path compensation value, an MCS adjustment value, physical downlink control channel (PDCCH) adjustment and other factors.

Taking the LTE system as an example, the base station determines, the uplink transmission power (dBm) of the PUSCH in one or more units of information transmission time, such as the sub-frame i, according to the following formula (1):

$$P_{PUSCH}(i)=\min\{P_{CMAX}, 10\ \log_{10}(M_{PUSCH}(i))+ P_{O\_PUSCH}(j)+\alpha(j)*PL+\Delta_{TF}(i)+f(i)\} \quad (1),$$

where $P_{CMAX}$ represents the maximum transmission power of the UE, $M_{PUSCH}(i)$ represents the number of resource blocks (RB) used for PUSCH transmission in the sub-frame i.

$P_{O\_PUSCH(j)}$, equals to $P_{O\_NOMINAL\_PUSCH}(j)+PO\_UE\_PUSCH(j)$, and is a semi-static power reference value. $P_{O\_NOMINAL\_PUSCH}(j)$ is a cell specific parameter, and $P_{O\_UE\_PUSCH}(j)$ is a UE specific parameter. Both the two parameters are indicated by high-level signaling, and may be configured to set different values for different data packets of uplink transmission. Moreover, the value of parameter j is related to the data packet of uplink transmission. When a semi-continuity licensed data packet is transmitted, j is equal to 0; when a dynamical scheduling licensed data packet is transmitted, j is equal to 1; and when a random-access response licensed data packet is transmitted, j is equal to 2.

α(j)*PL is a compensation amount for an open loop path loss obtained based on an estimation of downlink made by the UE, where α is a cell specific path loss compensation coefficient. When j is equal to 0 or 1, α is equal to {0, 0.4, 0.5, 0.6, 0.7, 0.8, 0.9, 1}, is a value that the high-level signaling 3 bit instructs the present cell to use, and is controlled by the high-level signaling. When j is equal to 2, α(2)=1, that is, complete path loss compensation is performed.

$\Delta_{TF}(i)$ is the MCS adjustment value. The power adjustment based on the MCS adjustment value may make the UE dynamically adjust a corresponding transmission power spectrum density according to the selected MCS. The MCS of the UE is scheduled by the base station. By setting the transmission MCS of the UE, the transmission power spectrum density of the UE may be adjusted quickly to achieve a similar effect of fast power control.

f(i) is an adjustment value formed by closed-loop power control of the UE and is sent through a PDCCH. The parameter is adjusted according to a transmission power control (TPC) command on the PDCCH, seeing 3GPPTS36.213 for the specific adjustment mode.

If the system in the present disclosure uses a power control strategy of the LTE system, referring to the formula (1), the present disclosure may reduce the uplink transmission power corresponding to the current uplink resource proportion in at least two following ways.

In the first way, the present disclosure may reduce the uplink transmission power corresponding to the current uplink resource proportion by adjusting one or more physical quantities in the formula (1).

Specifically, the embodiments of the present disclosure may reduce the uplink transmission power in one or more units of information transmission time on the PUSCH in at least one of the following manners.

In the first manner, the maximum transmission power corresponding to the preset high-power mode is reduced.

That is, when the uplink resource ratio $R_{UL}$ that the base station configures for the UE1 is greater than or equal to the preset uplink proportion threshold, the uplink transmission power $P_{PUSCH}(i)$ is reduced by reducing the maximum transmission power value $P_{CMAX}$ of the UE.

The present disclosure may reduce the maximum transmission power value $P_{CMAX}$ of the UE by means of at least two following modes.

In the first implementation mode, the original maximum transmission power of the UE is reduced by a preset power offset to obtain a corrected maximum transmission power.

Assuming that the original maximum transmission power is represented by $P_{CMAX0}$, the corrected maximum transmission power $P_{CMAX}$ may be represented by the following formula (2):

$$P_{CMAX}=P_{CMAX0}-\text{Delta\_}P_{CMAX}(R_{UL}) \quad (2),$$

where $\text{Delta\_}P_{CMAX}(R_{UL})$ represents a preset correction, and is also called a power offset. $\text{Delta\_}P_{CMAX}(R_{UL})$ will increase with the increase of the uplink resource ratio $R_{UL}$, that is, $\text{Delta\_}P_{CMAX}(R_{UL})$ is positively correlated with the $R_{UL}$.

In a TDD system, for example, the LTE TDD system, the uplink resource ratio $R_{UL}$ may be represented as: uplink transmission time t_UL in unit time. The unit time represents the length of unit information transmission time, for example, 1 ms. The formula (2) may also be expressed as the following formula (3):

$$P_{CMAX}=P_{CMAX0}-\text{Delta\_}P_{CMAX}(t\_UL) \quad (3).$$

Similarly, $\text{Delta\_}P_{CMAX}(t\_UL)$ increases with the increase of t_UL.

It is to be noted here that in the LTE system, the unit information transmission time may be a sub-frame. In the 5G NR system, the unit information transmission time may be a slot, a mini-slot, a symbol and other smaller resource units. The present disclosure does not limit the unit information transmission time.

In an embodiment of the present disclosure, the $\text{Delta\_}P_{CMAX}(R_{UL})$ may an adjustment value determined according to a preset MPR. The MPR may include a power management maximum power reduction (P-MPR). For example, the adjustment value corresponding to the original P-MPR is 2 dBm. In the first implementation mode of the present disclosure, the adjustment value corresponding to the P-MPR may be corrected to 3 dBm, such that the corrected $P_{CMAX}$ is less than $P_{CMAX0}$. When $P_{PUSCH}(i)$ determined by using the formula (1) is equal to $P_{CMAX}$, the uplink transmission power may be reduced.

In the second implementation mode, the original maximum transmission power of the UE is multiplied by a preset correction factor to obtain the corrected maximum transmission power, which may be expressed as the following formula (4):

$$P_{CMAX}=\text{alpha\_}P_{CMAX}(R_{UL})*P_{CMAX0} \quad (4),$$

where alpha_$P_{CMAX}(R_{UL})$ represents the above preset correction factor, and the value range of which is (0,1). alpha_$P_{CMAX}(R_{UL})$ will decrease with the increase of the uplink resource ratio $R_{UL}$.

Similarly, in the TDD system, if the uplink resource ratio $R_{UL}$ is expressed as: the uplink transmission time t_UL per unit time, the above formula (4) may be specifically expressed as the following formula (5):

$$P_{CMAX} = \text{alpha\_}P_{CMAX}(t\_UL) * P_{CMAX0} \quad (5).$$

Similarly, the value range of the correction factor of the maximum transmission power alpha_$P_{CMAX}$(t_UL) is the natural numbers of (0, 1), and the value of alpha_$P_{CMAX}$ (t_UL) decreases with the increase of t_UL.

In the second manner, the nominal power corresponding to the preset high-power mode is reduced.

The nominal power is $P_{O\_PUSCH}(j)$ in the above formula (1). Similar to the first manner, the present disclosure may also obtain the reduced nominal power by reducing the original nominal power by a correction or multiplying it by a preset correction factor, which will not be described here.

In the third manner, the path compensation value of a cell is reduced.

The path compensation value of the cell may be $\alpha(j)*PL$ in the above formula (1). The uplink transmission power of the UE may be reduced by reducing a path loss compensation coefficient $\alpha$ of the cell and/or reducing a cell specific path loss compensation quantity PL. Similar to the first manner and the second manner, $\alpha$ and PL may also be reduced by reducing them by the preset correction or multiplying them by the preset correction factor, which will not be repeated here.

In the fourth manner, a power offset, namely the MCS adjustment value, determined by the MCS and a data type is reduced.

The power offset is $\Delta_{TF}(i)$ in the above formula (1), the adjusting manner of which is similar to the first manner.

In the fifth manner, the adjustment value formed by the closed-loop power control of the UE is reduced.

Similar to the first manner, the present disclosure may reduce the adjustment value formed by the closed-loop power control of the UE by reducing it by a correction or multiplying it by the preset correction factor, as f(i) in the above formula (1).

When $P_{PUSCH}(i)$ determined by the formula (1) is not $P_{CMAX}$, the uplink transmission power may be reduced in the second manner to the fifth manner.

In the second way, a power adjustment value for reducing the uplink transmission power is determined on the basis of calculating an original transmission power value P0 according to the formula (1).

Figure 6:
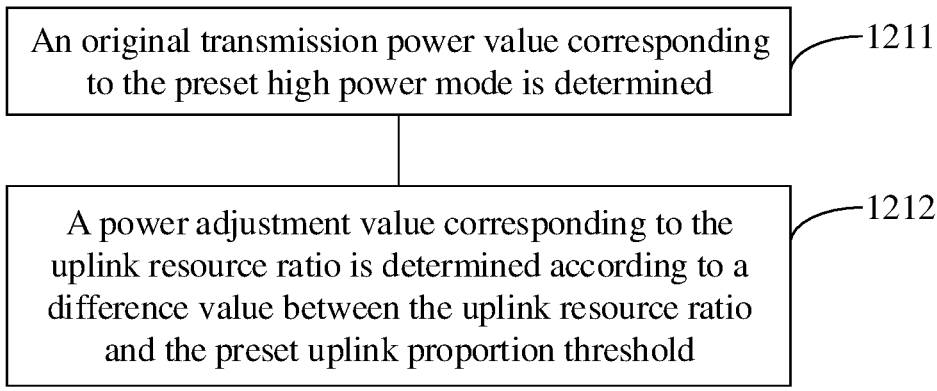
FIG. 6 is a flowchart showing a method for controlling uplink transmission power, according to an exemplary embodiment of the present disclosure.

Referring to FIG. 6 that illustrates a flowchart showing another method for controlling uplink transmission power according to an exemplary embodiment, the step 121 may include the following steps.

In step 1211, an original transmission power value corresponding to the preset high-power mode is determined. The original transmission power value is the uplink transmission power determined when the uplink resource proportion is less than the preset uplink proportion threshold.

As described above, the base station may determine preset uplink transmission power, namely the original transmission power value P0, configured for the UE1 according to the formula (1) when the Rut is less than 70%.

In step 1212, a power adjustment value corresponding to the uplink resource ratio is determined according to a difference value between the uplink resource ratio and the preset uplink proportion threshold. The power adjustment value is configured to reduce the uplink transmission power based on the original transmission power value.

If the difference value between the uplink resource ratio and the preset uplink proportion threshold is $\Delta R$, the power adjustment value is determined based on $\Delta R$ in the embodiments of the present disclosure.

The power adjustment value may be the preset power reduction $\Delta P$ or the power adjustment factor $\beta$ for reducing the uplink transmission power. Correspondingly, the target uplink transmission power may be expressed as: P=P0−$\Delta P$ or P=$\beta$*P0.

The implementation of the step 1212 may also include two modes.

In the first implementation mode, when the uplink resource ratio exceeds the preset uplink proportion threshold, a fixed power adjustment value is configured.

The base station may configure the adjustment value as a fixed value considering the allowance of power margin, for example, whatever the value of $\Delta R$ is, the original transmission power value P0 is reduced by 3 dBm.

In the second implementation mode, the base station sets different power adjustment values for the difference value between the uplink resource ratio and the preset uplink proportion threshold.

The power reduction $\Delta P$ that the base station determines for the UE1 may change according to the different uplink resource ratios $R_{UL}$. If the power adjustment value is the power reduction $\Delta P$, the value of $\Delta P$ increases with the increase of $\Delta R$. Similarly, if the power adjustment value is the power adjustment factor $\beta$, $\beta$ decreases with the increase of $\Delta R$.

Figure 7:
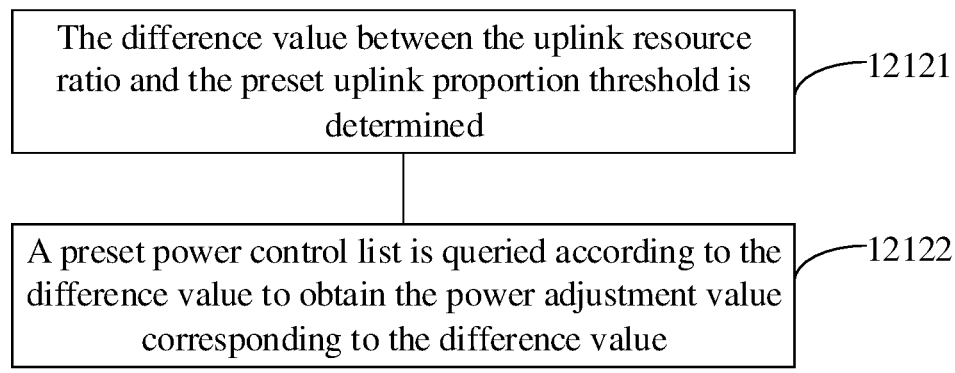
FIG. 7 is a flowchart showing another method for controlling uplink transmission power, according to an exemplary embodiment of the present disclosure.

Referring to FIG. 7 that illustrates a flowchart showing another method for controlling uplink transmission power according to an exemplary embodiment, the step 1212 may include the following steps.

In step 12121, the difference value between the uplink resource ratio and the preset uplink proportion threshold is determined.

In step 12122, a preset power control list is queried according to the difference value to obtain the power adjustment value corresponding to the difference value. The preset power control list includes a corresponding relationship between a range of the difference value and the power adjustment value.

In the present disclosure, the base station may store the preset power control list. The power control list includes the corresponding relationship between a range of the difference value and the power adjustment value, exemplarily, as illustrated in Table 2.

TABLE 2

| Difference value range | Power reduction $\Delta P$ |
|---|---|
| (0, 10%) | 1 dBm |
| [10%, 20%) | 2 dBm |
| [20%, 30%] | 3 dBm |

Still assuming that the preset uplink proportion threshold is 70%, if the $R_{UL}$ that the base station configures for the UE1 in the preset HPUE mode is 80%, then $\Delta R$=80%−70%=10%. By querying Table 2, it can be seen that the power reduction corresponding to the uplink resource ratio 80% is 2 dBm.

Or, the preset power control list is illustrated in Table 3.

TABLE 3

| Difference value range | Power adjustment factor β |
|---|---|
| (0, 10%) | 0.9 |
| [10%, 20%) | 0.8 |
| [20%, 30%] | 0.7 |

By querying Table 3, it can be seen that the power adjustment factor corresponding to the uplink resource ratio 80% is 0.8.

In another embodiment of the present disclosure, the base station may also determine the corresponding power adjustment value for the uplink resource ratio according to the relationship between the preset uplink proportion threshold and the first uplink proportion threshold.

If the preset uplink proportion threshold is less than the first uplink proportion threshold, the first uplink proportion threshold is the uplink proportion threshold corresponding to the upper limit value of SAR.

Figure 8:
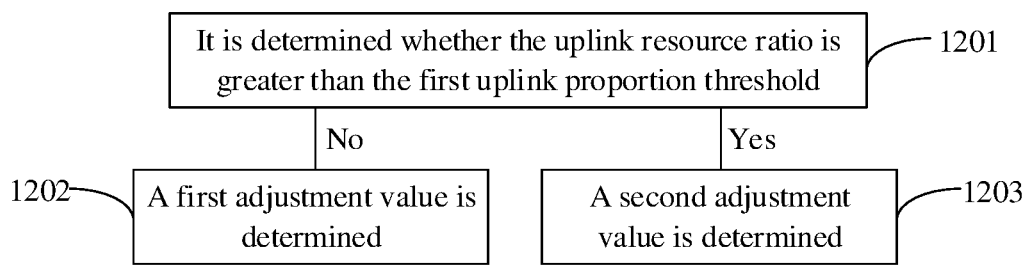
FIG. 8 is a flowchart showing another method for controlling uplink transmission power, according to an exemplary embodiment of the present disclosure.

Referring to FIG. 8 that illustrates a flowchart showing another method for controlling uplink transmission power according to an exemplary embodiment, the step 1212 may include the following steps.

In step 1201, it is determined whether the uplink resource ratio is greater than the first uplink proportion threshold.

In step 1202, if the uplink resource ratio is greater than or equal to the preset uplink proportion threshold and less than the first uplink proportion threshold, a first adjustment value is determined.

In step 1203, if the uplink resource ratio is greater than or equal to the first uplink proportion threshold, a second adjustment value is determined. A power reduction corresponding to the first adjustment value is less than a power reduction corresponding to the second adjustment value.

Exemplarily, assuming that the preset uplink proportion threshold is 70% and the first uplink proportion threshold corresponding to the upper limit value of SAR is 75%, the corresponding relationship between the uplink resource ratio Rut that the base station configures for the UE in the preset HPUE mode and the power reduction ΔP may be illustrated in Table 4.

TABLE 4

| Equipment identification | HPUE mode | Uplink resource ratio $R_{UL}$ | Power reduction ΔP |
|---|---|---|---|
| UE1 | power class 2 | 70% < $R_{UL}$ < 75%<br>$R_{UL}$ ≥ 75% | ΔP1<br>ΔP2 |

In Table 4, ΔP1 is less than ΔP2.

In the embodiments of the present disclosure, given that the probability and harm of exceeding a standard SAR before the $R_{UL}$ exceeds 75% is smaller than the probability and harm of exceeding a standard SAR after the $R_{UL}$ exceeds 75%, two different power adjustment values, namely the first adjustment value and the second adjustment value, are configured to perform power control to the UE, which can not only ensure uplink coverage but also avoid exceeding a standard SAR.

Figure 9A:
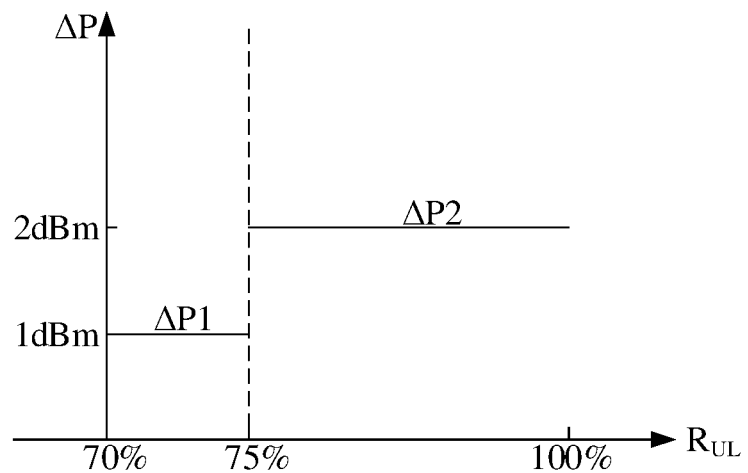
FIG. 9A is a schematic diagram of a scenario of controlling uplink transmission power, according to an exemplary embodiment of the present disclosure.

Corresponding to the first implementation mode in the step 1212, ΔP1 and ΔP2 may be fixed values which may not be changed with the $R_{UL}$, for example, ΔP1=1 dBm and ΔP2=2 dBm, referring to FIG. 9A that illustrates a schematic diagram of controlling the uplink transmission power according to an exemplary embodiment.

Corresponding to the second implementation mode in the step 1212, ΔP1 and ΔP2 may also be dynamic values changing with different $R_{UL}$. For the case that ΔP1 and ΔP2 change with different $R_{UL}$, different power adjustment values may be determined according to different situations in which the uplink resource ratio is close to the first uplink proportion threshold in the present disclosure.

As illustrated in Table 4, for 70%<$R_{UL}$<75%, the closer to 75% the $R_{UL}$ is, the larger the power reduction ΔP1 corresponding to the first adjustment value is.

Figure 9B:
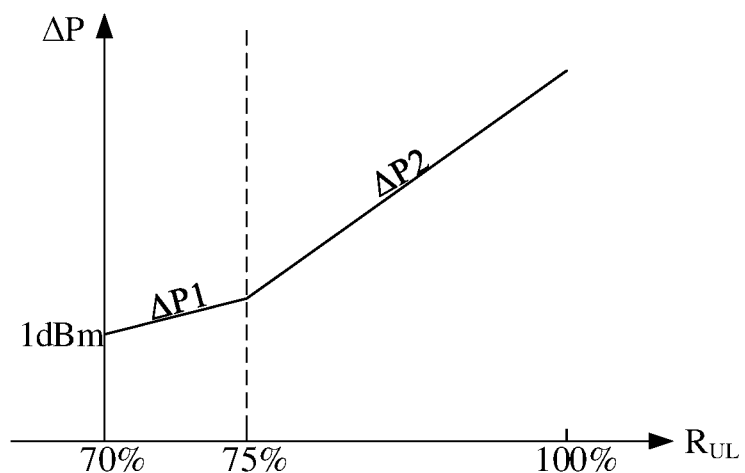
FIG. 9B is a schematic diagram of another scenario of controlling uplink transmission power, according to an exemplary embodiment of the present disclosure.

Similarly, for $R_{UL}$, 75%, the farther from 75% the $R_{UL}$ is, the larger the power reduction ΔP2 corresponding to the second adjustment value is. Referring to FIG. 9B that illustrates a schematic diagram of another scenario of controlling the uplink transmission power according to an exemplary embodiment, the increment of ΔP2 may also be greater than the increment of ΔP1, so as to ensure that the UE is as far away from fluctuations in device performance as possible while meeting the uplink transmission requirement, for example, exceeding a standard SAR caused by the inconsistency in performance of an RF transmitting element.

In step 122, the power adjustment information is determined according to the power adjustment result.

Corresponding to the first manner in the step 121, the base station may determine the power adjustment information according to the target uplink transmission power obtained in the first manner.

Corresponding to the second manner in the step 122, the base station may determine the power adjustment information based on the original transmission power value and the power adjustment value.

In step 13, the uplink resource ratio and the power adjustment information are sent to the UE, such that the UE controls uplink transmission power according to the power adjustment information when transmitting uplink information according to the uplink resource ratio in the preset high-power mode.

In the present disclosure, the base station may simultaneously send the uplink resource ratio $R_{UL}$ and the corresponding power adjustment information to the UE through preset downlink control signaling.

In another embodiment, the base station may also send transmission resource allocation information to the UE in advance. The transmission resource allocation information includes a corresponding relationship between the preset high-power mode and the uplink resource ratio $R_{UL}$. After that, when the UE is configured in the preset high-power mode such as the power class 2 mode, power control information corresponding to the $R_{UL}$ is sent to the UE through the power configuration information. Here, the $R_{UL}$ refers to the uplink resource ratio greater than the preset uplink proportion threshold.

Moreover, in another embodiment of the present disclosure, if the power adjustment information includes an original transmission power value and a power adjustment value.

The base station may also send the original transmission power value and the power adjustment value corresponding to the uplink resource ratio to the UE in different time cycles. For example, when the UE is configured in the preset high-power mode, and the uplink resource ratio exceeds the preset uplink proportion threshold, the base station sends the original transmission power value to the UE for every ten sub-frames, and sends the power adjustment value to the UE for each sub-frame, so as to avoid sending the original transmission power value repeatedly for each frame and thus achieve the purpose of saving signaling overhead.

Figure 10:
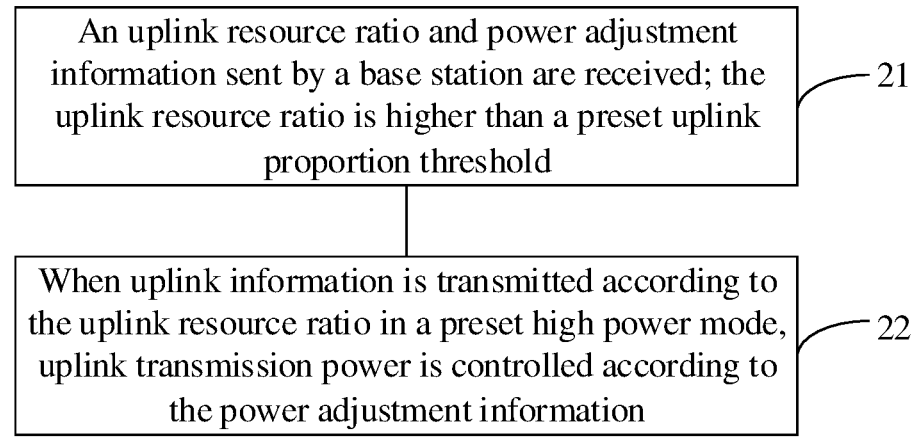
FIG. 10 is a flowchart showing a method for controlling uplink transmission power, according to an exemplary embodiment of the present disclosure.

Correspondingly, the present disclosure also provides a method for controlling uplink transmission power, which is applied to the UE. Referring to FIG. 10 that illustrates a flowchart showing a method for controlling uplink transmission power according to an exemplary embodiment, the method may include the following steps.

In step 21, an uplink resource ratio and power adjustment information sent by a base station are received. The uplink resource ratio is higher than a preset uplink proportion threshold.

Corresponding to the step 13, a piece of UE (for example, the UE1) may receive the $R_{UL}$ for a preset high-power mode and its corresponding power adjustment information at the same time. Or, the UE receives the information at different times.

In step 22, when uplink information is transmitted according to the uplink resource ratio in a preset high-power mode, uplink transmission power is controlled according to the power adjustment information.

When the UE is configured in the preset high-power mode, and transmits the uplink information according to the uplink resource ratio which exceeds the preset uplink proportion threshold, the uplink transmission power is controlled according to the power adjustment information, such that the uplink transmission power is less than an original transmission power value. The original transmission power value is uplink transmission power determined when the uplink resource ratio is less than the preset uplink proportion threshold.

According to different information included in the power adjustment information, the UE may control the uplink transmission power in the following manners.

In the first manner, if the power adjustment information includes target uplink transmission power P corresponding to the uplink resource ratio, the UE transmits the uplink information directly according to the target uplink transmission power P.

In the second manner, if the power adjustment information may include: an original transmission power value P0 and the power adjustment value, the UE first determines the target uplink transmission power P according to the original transmission power value P0 and the power adjustment value, and transmits the uplink information according to the target uplink transmission power P.

If the power adjustment value is a preset power reduction ΔP corresponding to the uplink resource ratio $R_{UL}$, the UE determines the target uplink transmission power according formula P=P0-ΔP.

If the power adjustment value is a preset power adjustment factor β corresponding to the uplink resource ratio $R_{UL}$, the UE determines the target uplink transmission power according formula P=β*P0.

To sum up, for a piece of UE such as the UE1, if the preset high-power mode is a power class 2 mode, a relationship between the uplink transmission power and the uplink resource ratio may be illustrated in Table 5.

TABLE 5

| HPUE mode | Uplink resource ratio $R_{UL}$ | Uplink transmission power |
| --- | --- | --- |
| power class 2 | $R_{UL}$ < 70% | P0 |
| | $R_{UL}$ ≥ 70% | P = P0 − ΔP or P = β*P0 |

It can be seen from Table 5 that if the $R_{UL}$ that the base station configures for the UE1 in the power class 2 mode is less than the preset uplink proportion threshold 70%, the UE1 transmits the uplink information according to the preset original transmission power value P0; conversely, if the $R_{UL}$ is greater than or equal to the preset uplink proportion threshold 70%, the UE1 transmits, based on the power adjustment information, the uplink information according to the target uplink transmission power P obtained by reducing the original transmission power value P0, which can not only ensure uplink data transmission performance, such as uplink throughput, of the UE1, but also effectively avoid exceeding a standard SAR by adjusting the transmission power.

Figure 11:
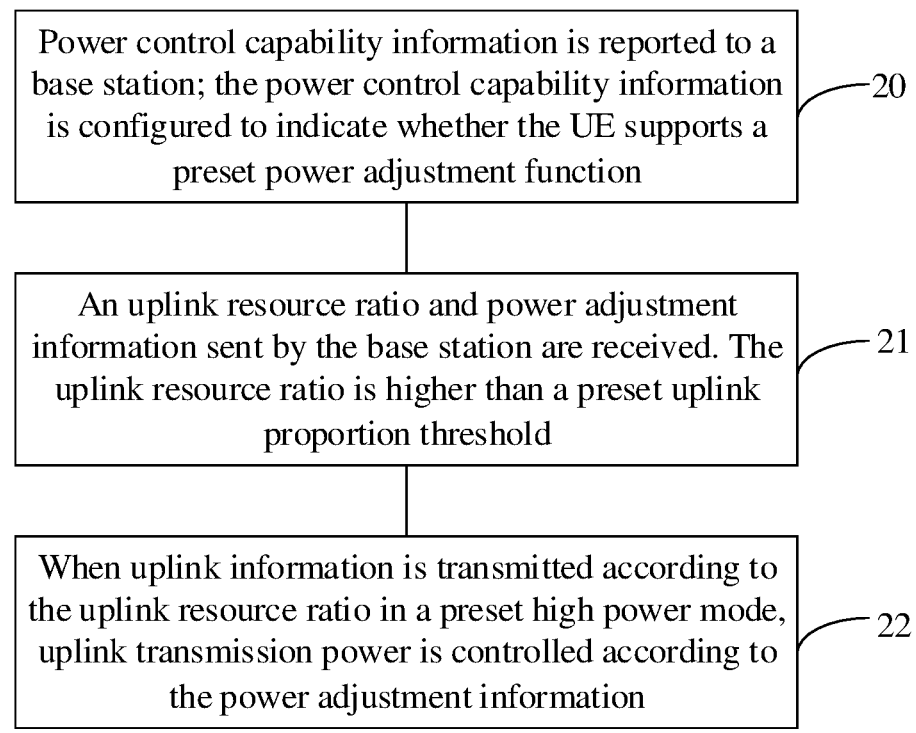
FIG. 11 is a flowchart showing another method for controlling uplink transmission power, according to an exemplary embodiment of the present disclosure.

Referring to FIG. 11 that illustrates a flowchart showing a method for controlling uplink transmission power according to an exemplary embodiment, before the step 21, the method may further include as follows.

In step 20, power control capability information is reported to the base station. The power control capability information is configured to indicate whether the UE supports a preset power adjustment function. The preset power adjustment function is configured to avoid exceeding a standard SAR by adjusting the uplink transmission power when the uplink resource ratio exceeds the preset uplink proportion threshold corresponding to the preset high-power mode.

Corresponding to the step 1111 in FIG. 3, the UE may inform the base station whether it supports the preset power adjustment function through a capability indicator in the power control capability information reported to the base station, or implicitly informs the base station that it supports the preset power adjustment function directly through the preset uplink proportion threshold corresponding to the preset high-power mode. Or, the UE explicitly informs the base station that it supports the preset power adjustment function through the capability indicator in combination with the preset uplink proportion threshold corresponding to the preset high-power mode, referring to the description in the step 1112, which will not be repeated here.

It is to be noted that in the present disclosure, the base station may send the resource allocation information and the power adjustment information to the UE through broadcasting signaling, upper level signaling and physical layer downlink signaling. The upper signaling may be radio resource control (RRC) signaling and medium access control (MAC) control element (CE) signaling.

For simple description, each of the above method embodiments is expressed as a combination of a series of operations, but those skilled in the art should know that the present disclosure is not limited to the described operation sequence because some steps may be executed in other sequences or at the same time according to the present disclosure.

Secondly, those skilled in the art should also know that the embodiments described in the specification are optional embodiments, and the operations and modules involved are not necessarily necessary for the present disclosure.

Corresponding to the embodiments of an application function realization method, the present disclosure also provides embodiments of an application function realization device and a corresponding terminal.

Figure 12:
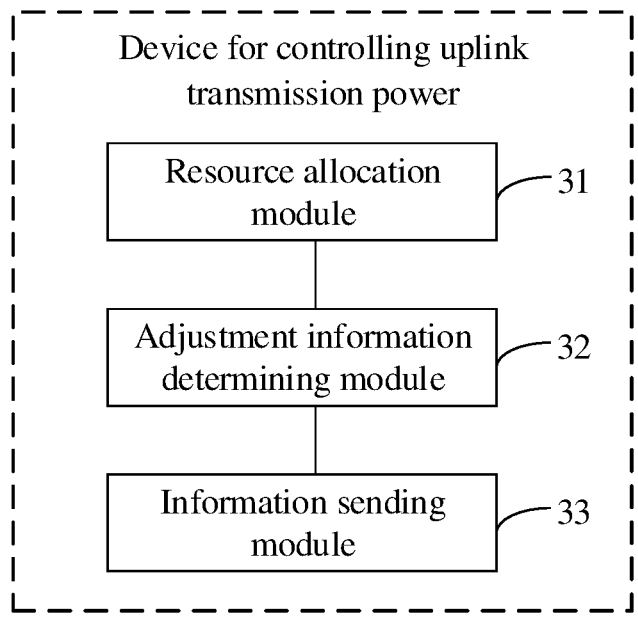
FIG. 12 is a block diagram of a device for controlling uplink transmission power, according to an exemplary embodiment of the present disclosure.

Correspondingly, the present disclosure provides a device for controlling uplink transmission power, which may be in the base station. Referring to FIG. 12 that illustrates a block diagram of a device for controlling uplink transmission power according to an exemplary embodiment, the device may include: a resource allocation module 31, an adjustment information determining module 32 and an information sending module 33.

The resource allocation module 31 is configured to determine an uplink resource ratio of UE in a preset high-power mode.

The adjustment information determining module 32 is configured to determine power adjustment information if the uplink resource ratio is greater than or equal to a preset uplink proportion threshold corresponding to the preset high-power mode.

The information sending module 33 is configured to send the uplink resource ratio and the power adjustment information to the UE, such that the UE controls uplink transmission power according to the power adjustment information when transmitting uplink information according to the uplink resource ratio in the preset high-power mode.

Figure 13:
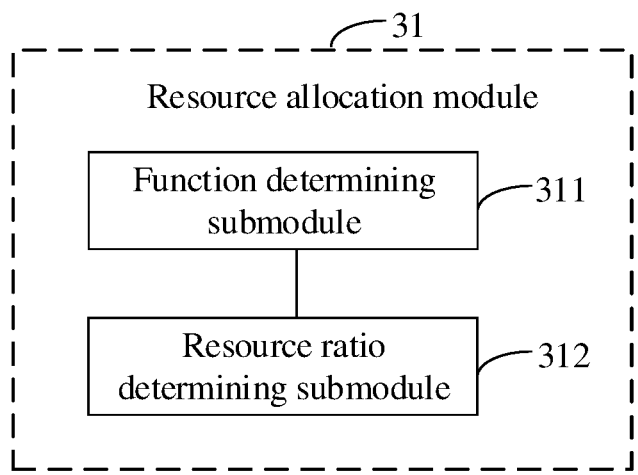
FIG. 13 is a block diagram of another device for controlling uplink transmission power, according to an exemplary embodiment of the present disclosure.

Referring to FIG. 13 that illustrates a block diagram of another device for controlling uplink transmission power according to an exemplary embodiment, on the basis of the device embodiment illustrated in FIG. 12, the resource allocation module 31 may include: a function determining submodule 311 and a resource ratio determining submodule 312.

The function determining submodule 311 is configured to determine whether the UE supports a preset power adjustment function, and the preset power adjustment function is configured to avoid exceeding a standard SAR by adjusting the uplink transmission power when the uplink resource ratio exceeds the preset uplink proportion threshold corresponding to the preset high-power mode.

The resource ratio determining submodule 312 is configured to determine, if the UE supports the preset power adjustment function, the uplink resource ratio according to a first uplink proportion threshold corresponding to the preset high-power mode. The first uplink proportion threshold is an uplink proportion threshold corresponding to an upper limit value of SAR.

Figure 14:
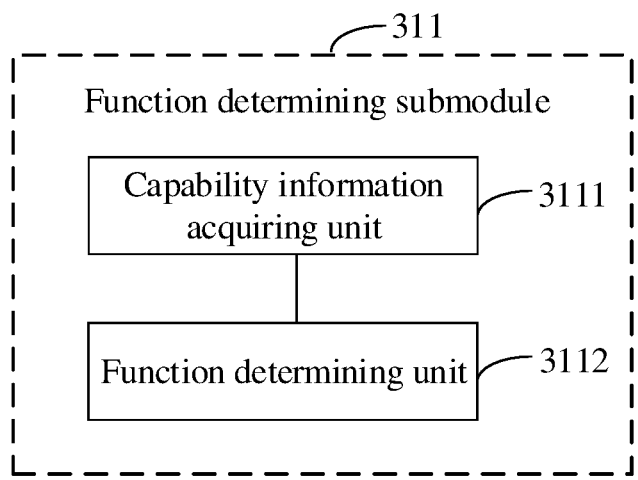
FIG. 14 is a block diagram of another device for controlling uplink transmission power, according to an exemplary embodiment of the present disclosure.

Referring to FIG. 14 that illustrates a block diagram of another device for controlling uplink transmission power according to an exemplary embodiment, on the basis of the device embodiment illustrated in FIG. 13, the function determining submodule 311 may include: a capability information acquiring unit 3111 and a function determining unit 3112.

The capability information acquiring unit 3111 is configured to acquire power control capability information of the UE.

The function determining unit 3112 is configured to determine whether the UE supports the preset power adjustment function according to the power control capability information.

In another device embodiment, the capability information acquiring unit 3111 may be configured to receive the power control capability information reported by the UE. The power control capability information includes at least one of: a capability indicator indicating whether the preset power adjustment function is supported, or the preset uplink proportion threshold corresponding to the preset high-power mode.

Figure 15:
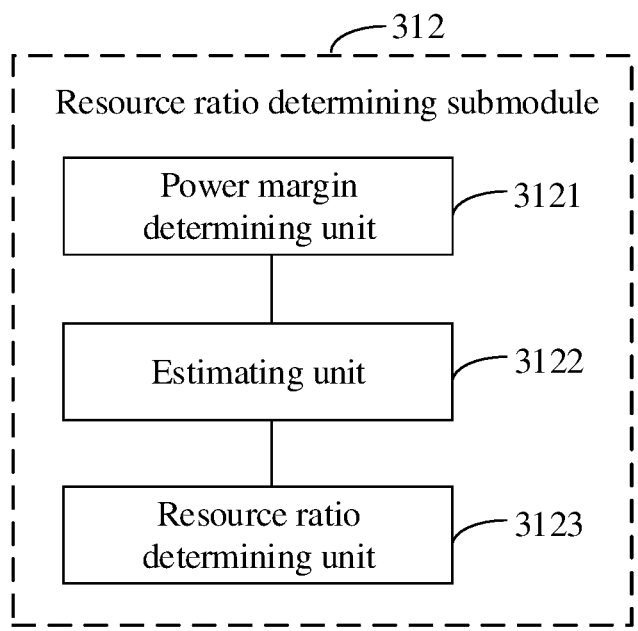
FIG. 15 is a block diagram of another device for controlling uplink transmission power, according to an exemplary embodiment of the present disclosure.

Referring to FIG. 15 that illustrates a block diagram of another device for controlling uplink transmission power according to an exemplary embodiment, on the basis of the device embodiment illustrated in FIG. 13, the resource ratio determining submodule 312 may include: a power margin determining unit 3121, an estimating unit 3122 and a resource ratio determining unit 3123.

The power margin determining unit 3121 is configured to determine a power margin according to maximum transmission power of the UE in the preset high-power mode.

The estimating unit 3122 is configured to determine a configurable maximum uplink proportion based on the power margin.

The resource ratio determining unit 3123 is configured to determine an uplink proportion higher than the first uplink proportion threshold as the uplink resource ratio. The uplink resource ratio does not exceed the maximum uplink proportion.

Figure 16:
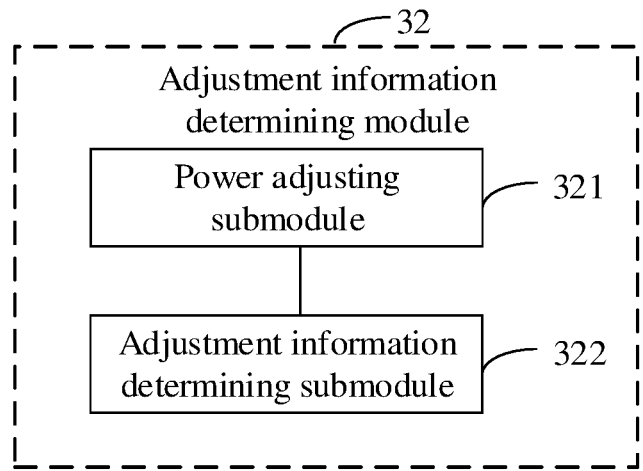
FIG. 16 is a block diagram of another device for controlling uplink transmission power, according to an exemplary embodiment of the present disclosure.

Referring to FIG. 16 that illustrates a block diagram of another device for controlling uplink transmission power according to an exemplary embodiment, on the basis of the device embodiment illustrated in FIG. 12, the adjustment information determining module 32 may include: a power adjusting submodule 321 and an adjustment information determining submodule 322.

The power adjusting submodule 321 is configured to reduce the uplink transmission power corresponding to the uplink resource ratio according to preset strategies, and obtain a power adjustment result.

The adjustment information determining submodule 322 is configured to determine the power adjustment information according to the power adjustment result.

Figure 17:
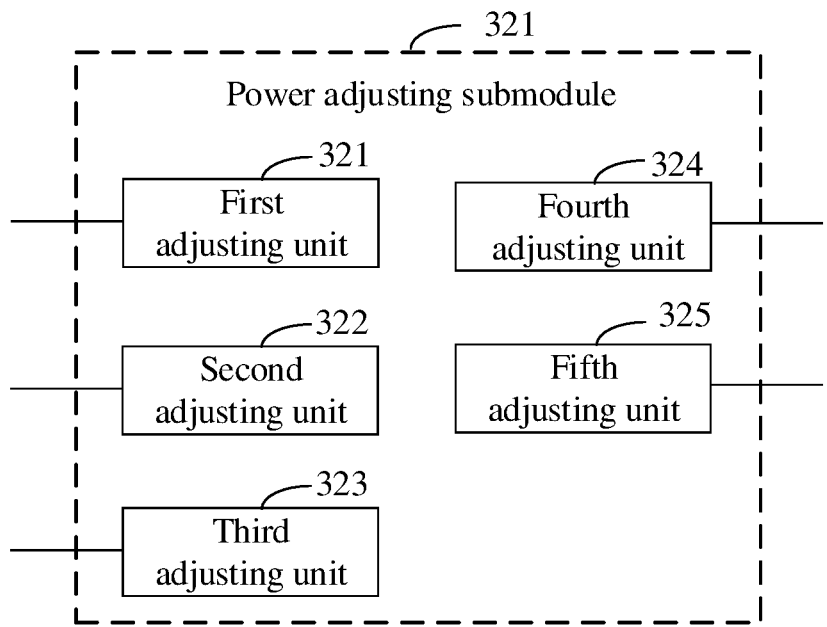
FIG. 17 is a block diagram of another device for controlling uplink transmission power, according to an exemplary embodiment of the present disclosure.

Referring to FIG. 17 that illustrates a block diagram of another device for controlling uplink transmission power according to an exemplary embodiment, on the basis of the device embodiment illustrated in FIG. 16, the power adjusting submodule 321 may include at least one of: a first adjusting unit 3211, a second adjusting unit 3212, a third adjusting unit 3213, a fourth adjusting unit 3214 or a fifth adjusting unit 3215.

The first adjusting unit 3211 is configured to reduce maximum transmission power corresponding to the preset high-power mode.

In a device embodiment of the present disclosure, the first adjusting unit 3211 may be configured to reduce the maximum transmission power corresponding to the preset high-power mode according to an adjustment value determined by a preset MPR.

The second adjusting unit 3212 is configured to reduce nominal power corresponding to the preset high-power mode.

The third adjusting unit 3213 is configured to reduce a path compensation value of a cell.

The fourth adjusting unit 3214 is configured to reduce an MCS adjustment value determined by an MCS and a data type.

The fifth adjusting unit 3215 is configured to reduce an adjustment value formed by closed-loop power control of the UE.

Figure 18:
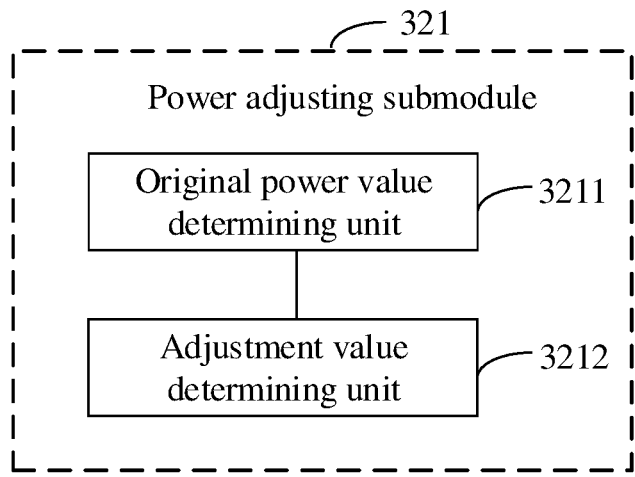
FIG. 18 is a block diagram of another device for controlling uplink transmission power, according to an exemplary embodiment of the present disclosure.

Referring to FIG. 18 that illustrates a block diagram of another device for controlling uplink transmission power according to an exemplary embodiment, on the basis of the device embodiment illustrated in FIG. 16, the power adjusting submodule 321 may include: an original power value determining unit 3211 and an adjustment value determining unit 3212.

The original power value determining unit 3211 is configured to determine an original transmission power value corresponding to the preset high-power mode. The original transmission power value is preset uplink transmission power determined when the uplink resource ratio is less than the preset uplink proportion threshold.

The adjustment value determining unit 3212 is configured to determine a power adjustment value corresponding to the uplink resource ratio according to a difference value between the uplink resource ratio and the preset uplink proportion threshold. The power adjustment value is configured to reduce the uplink transmission power based on the original transmission power value.

In the embodiments of the present disclosure, the power adjustment value may include: a power reduction of target uplink transmission power relative to the original transmission power value or a power adjustment factor for reducing the uplink transmission power.

Correspondingly, the adjustment information determining submodule 322 may be configured to determine the power adjustment information based on the original transmission power value and the power adjustment value.

Figure 19:
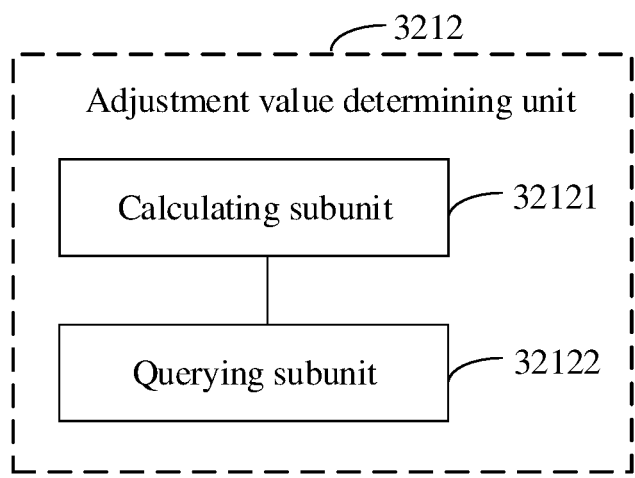
FIG. 19 is a block diagram of another device for controlling uplink transmission power, according to an exemplary embodiment of the present disclosure.

Referring to FIG. 19 that illustrates a block diagram of another device for controlling uplink transmission power according to an exemplary embodiment, on the basis of the device embodiment illustrated in FIG. 18, the adjustment value determining unit 3212 may include: a calculating subunit 32121 and a querying subunit 32122.

The calculating subunit 32121 is configured to determine the difference value between the uplink resource ratio and the preset uplink proportion threshold.

The querying subunit 32122 is configured to query a preset power control list according to the difference value to obtain the power adjustment value corresponding to the difference value. The preset power control list includes a corresponding relationship between a range of the difference value and the power adjustment value.

Figure 20:
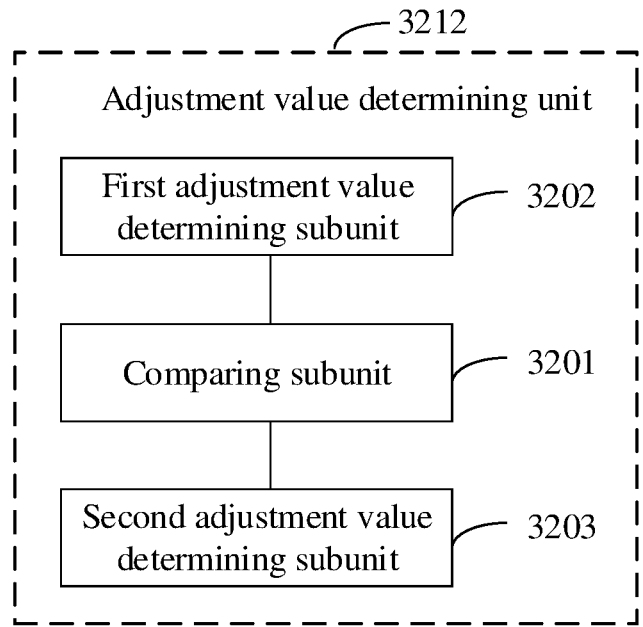
FIG. 20 is a block diagram of another device for controlling uplink transmission power, according to an exemplary embodiment of the present disclosure.

In a device embodiment of the present disclosure, if the preset uplink proportion threshold is less than the first uplink proportion threshold, the first uplink proportion threshold is the uplink proportion threshold corresponding to the upper limit value of SAR. Referring to FIG. 20 that illustrates a block diagram of another device for controlling uplink transmission power according to an exemplary embodiment, on the basis of the device embodiment illustrated in FIG. 18, the adjustment value determining unit 3212 may include: a comparing subunit 3201, a first adjustment value determining subunit 3202 and a second adjustment value determining subunit 3203.

The comparing subunit 3201 is configured to determine whether the uplink resource ratio is greater than the first uplink proportion threshold.

The first adjustment value determining subunit 3202 is configured to determine a first adjustment value if the uplink resource ratio is less than the first uplink proportion threshold.

The second adjustment value determining subunit 3203 is configured to determine a second adjustment value if the uplink resource ratio is greater than or equal to the first uplink proportion threshold. The power reduction determined by using the second adjustment value is not less than the power reduction determined by using the first adjustment value.

Figure 21:
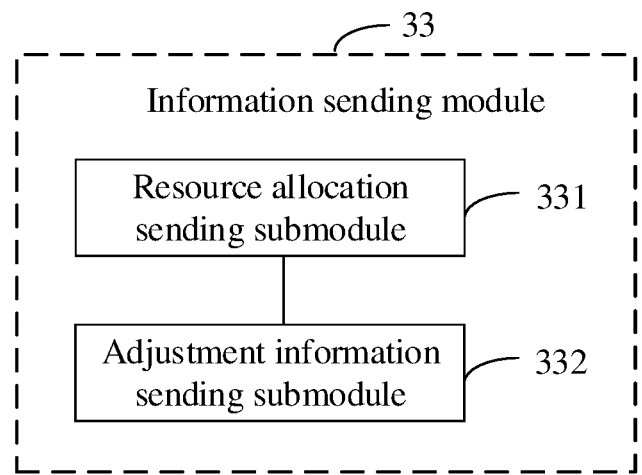
FIG. 21 is a block diagram of another device for controlling uplink transmission power, according to an exemplary embodiment of the present disclosure.

Referring to FIG. 21 that illustrates a block diagram of another device for controlling uplink transmission power according to an exemplary embodiment, on the basis of the device embodiment illustrated in FIG. 12, the information sending module 33 may include: a resource allocation sending submodule 331 and an adjustment information sending submodule 332.

The resource allocation sending submodule 331 is configured to send uplink resource ratio information to the UE.

The adjustment information sending submodule 332 is configured to send the power adjustment information to the UE.

In an embodiment, if the power adjustment information includes the original transmission power value and the power adjustment value, the adjustment information sending submodule 332 may be configured to send the original transmission power value and the power adjustment value to the UE in different time cycles.

Corresponding to the method for controlling uplink transmission power performed by the UE, the present disclosure also provides a device for controlling uplink transmission power, which may be provided in the UE.

Figure 22:
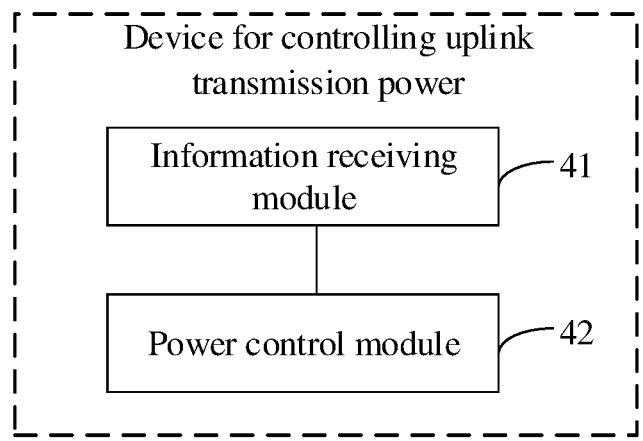
FIG. 22 is a block diagram of a device for controlling uplink transmission power, according to an exemplary embodiment of the present disclosure.

Referring to FIG. 22 that illustrates a block diagram of a device for controlling uplink transmission power according to an exemplary embodiment, the device may include: an information receiving module 41 and a power control module 42.

The information receiving module 41 is configured to receive an uplink resource ratio and power adjustment information in a preset high-power mode which are sent by a base station. The uplink resource ratio is higher than a preset uplink proportion threshold.

The power control module 42 is configured to control, when uplink information is transmitted according to the uplink resource ratio in the preset high-power mode, uplink transmission power according to the power adjustment information.

Figure 23:
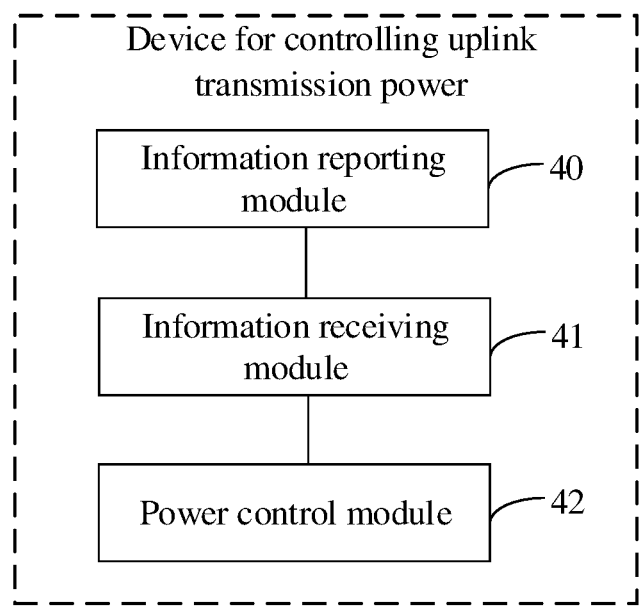
FIG. 23 is a block diagram of another device for controlling uplink transmission power, according to an exemplary embodiment of the present disclosure.

Referring to FIG. 23 that illustrates a block diagram of another device for controlling uplink transmission power according to an exemplary embodiment, on the basis of the device embodiment illustrated in FIG. 22, the device may further include an information reporting module 40.

The information reporting module 40 is configured to report power control capability information to the base station. The power control capability information is configured to indicate whether UE supports a preset power adjustment function. The preset power adjustment function is configured to avoid exceeding a standard SAR by adjusting the uplink transmission power when the uplink resource ratio exceeds the preset uplink proportion threshold corresponding to the preset high-power mode.

The power control capability information includes at least one of: a capability indicator indicating whether the preset power adjustment function is supported, or the preset uplink proportion threshold corresponding to the preset high-power mode.

In a device embodiment of the present disclosure, the power adjustment information received by the information receiving module 41 includes: an original transmission power value and a power adjustment value.

Figure 24:
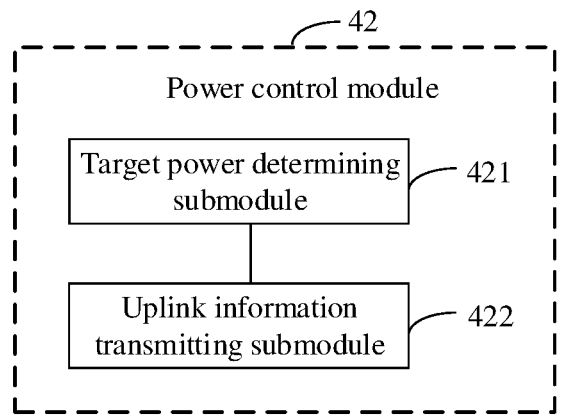
FIG. 24 is a block diagram of another device for controlling uplink transmission power, according to an exemplary embodiment of the present disclosure.

Referring to FIG. 24 that illustrates a block diagram of another device for controlling uplink transmission power according to an exemplary embodiment, on the basis of the device embodiment illustrated in FIG. 22, the power control module 42 may include: a target power determining submodule 421 and an uplink information transmitting submodule 422.

The target power determining submodule 421 is configured to determine target uplink transmission power according to the original transmission power value and the power adjustment value.

In a device embodiment of the present disclosure, if the power adjustment value is a preset power reduction, the target power determining submodule 421 may be configured to reduce the original transmission power value by the preset power reduction to obtain the target uplink transmission power.

In another device embodiment of the present disclosure, if the power adjustment value is a preset power adjustment factor for reducing the uplink transmission power, the target power determining submodule 421 may be configured to determine the target uplink transmission power according to the product of the original transmission power value and the preset power adjustment factor.

The uplink information transmitting submodule 422 is configured to transmit the uplink information according to the target uplink transmission power.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, on an aspect, a base station is provided, which may include:
a processor; and
a memory configured to store instructions executable by the processor.

The processor is configured to:
determine an uplink resource ratio of UE in a preset high-power mode;
determine, if the uplink resource ratio is greater than or equal to a preset uplink proportion threshold corresponding to the preset high-power mode, power adjustment information; and
send the uplink resource ratio and the power adjustment information to the UE, such that the UE controls the uplink transmission power according to the power adjustment information when transmitting uplink information according to the uplink resource ratio in the preset high-power mode.

On another aspect, a base station is provided, which may include:
a processor; and
a memory configured to store instructions executable by the processor.

The processor is configured to:
receive an uplink resource ratio and power adjustment information in a preset high-power mode which are sent by the base station, the uplink resource ratio being higher than a preset uplink proportion threshold; and
when uplink information is transmitted according to the uplink resource ratio in the preset high-power mode, control uplink transmission power according to the power adjustment information.

Figure 25:
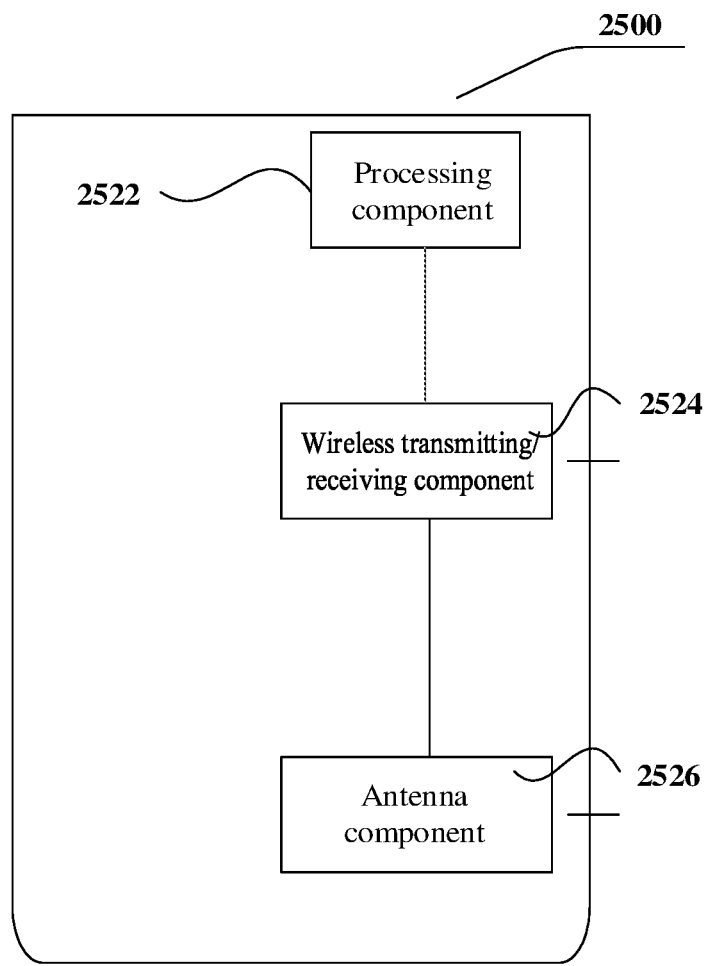
FIG. 25 is a structural diagram of a base station, according to an exemplary embodiment of the present disclosure.

FIG. 25 is a structural diagram of a base station 2500 according to an exemplary embodiment. The base station may be applied to LTE and 5G NR networks. Referring to FIG. 25, the base station 2500 includes a processing component 2522, a wireless transmitting/receiving component 2524, an antenna component 2526, and a special signal processing part of a wireless interface. The processing component 2522 may further include one or more processors.

A processor of the processing component 2522 may be configured to: determine an uplink resource ratio of UE in a preset high-power mode; if the uplink resource ratio is greater than or equal to a preset uplink proportion threshold corresponding to the preset high-power mode, determine power adjustment information; and send the uplink resource ratio and the power adjustment information to the UE, such that the UE controls uplink transmission power according to the power adjustment information when transmitting uplink information according to the uplink resource ratio in the preset high-power mode.

In an exemplary embodiment, there is also provided a non-transitory computer-readable storage medium including instructions, in which computer instructions are stored. The computer instructions may be executed by the processing component 2522 of the base station 2500 to complete the method for controlling uplink transmission power as illustrated in any one of FIG. 1 to FIG. 8. For example, the non-transitory computer-readable storage medium may be a read-only memory (ROM), a random-access memory (RAM), a compact disc read-only memory (CD-ROM), a magnetic tape, a floppy disc, an optical data storage device, and the like.

Figure 26:
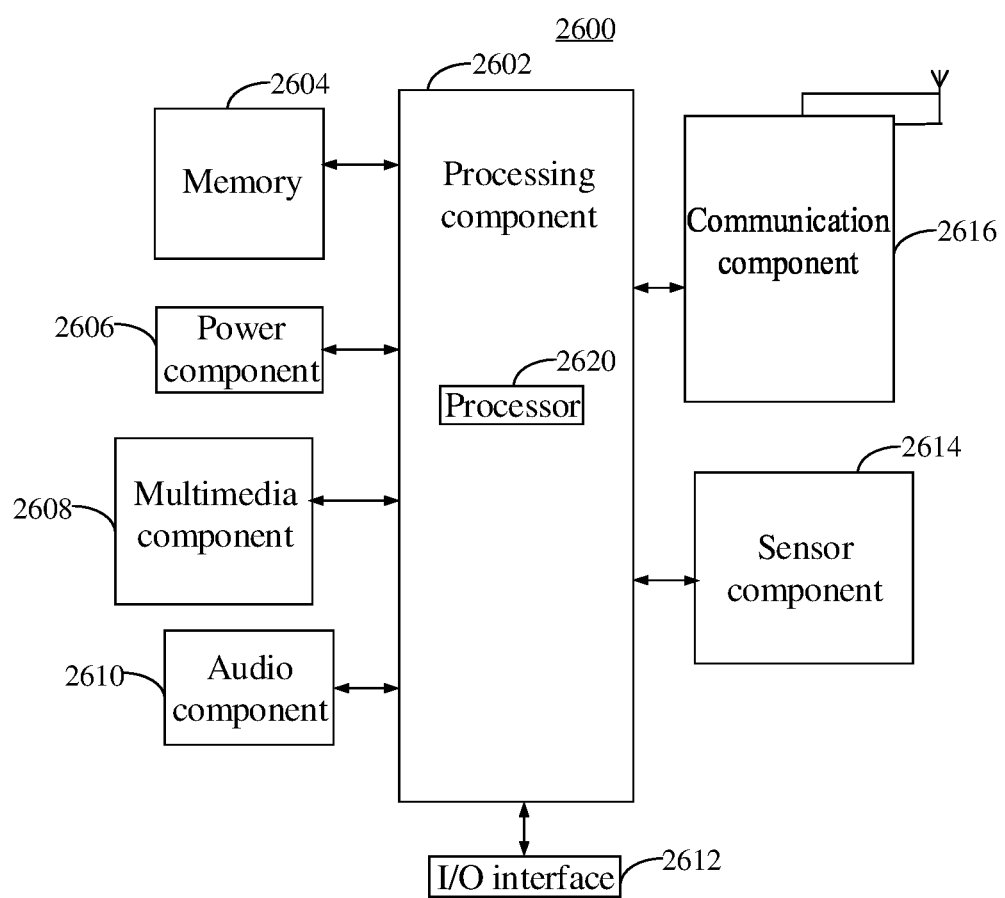
FIG. 26 is a structural diagram of UE, according to an exemplary embodiment of the present disclosure.

FIG. 26 is a structural diagram of UE 2600 according to an exemplary embodiment. For example, the UE 2600 may be a terminal in the LTE and 5G NR networks, specifically a mobile phone, a computer, a digital broadcast terminal, a messaging device, a gaming console, a tablet, a medical device, exercise equipment, a personal digital assistant, and wearable devices such as a smart watch, intelligent glasses, a smart bracelet, smart running shoes, and the like.

Referring to FIG. 26, the device 2600 may include one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls overall operations of the device 2600, such as the operations associated with display, telephone calls, data communications, camera operations, and recording operations. The processing component 2602 may include one or more processors 2620 to execute instructions to perform all or part of the steps in the above method. Moreover, the processing component 2602 may include one or more modules which facilitate interaction between the processing component 2602 and other components. For instance, the processing component 2602 may include a multimedia module to facilitate interaction between the multimedia component 2608 and the processing component 2602.

The memory 2604 is configured to store various types of data to support the operation of the device 2600. Examples of such data include instructions for any applications or methods operated on the device 2600, contact data, phonebook data, messages, pictures, video, etc. The memory 2604 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 2606 provides power for various components of the device 2600. The power component 2606 may include a power management system, one or more power supplies, and other components associated with generation, management and distribution of power for the device 2600.

The multimedia component 2608 includes a screen providing an output interface between the device 2600 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 2608 includes a front camera and/or a rear camera. The front camera and/or the rear camera may receive external multimedia data when the device 2600 is in an operation mode, such as a photographing mode or a video mode. Each of the front camera and the rear camera may be a fixed optical lens system or have focusing and optical zooming capabilities.

The audio component 2610 is configured to output and/or input an audio signal. For example, the audio component 2610 includes a microphone (MIC), and the MIC is configured to receive an external audio signal when the device 2600 is in an operation mode, such as a call mode, a recording mode and a voice recognition mode. The received audio signal may further be stored in the memory 2604 or sent through the communication component 2616. In some embodiments, the audio component 2610 further includes a speaker configured to output the audio signal.

The I/O interface 2612 provides an interface between the processing component 2602 and peripheral interface modules, such as a keyboard, a click wheel, buttons and the like. The buttons may include, but are not limited to: a home button, a volume button, a starting button and a locking button.

The sensor component 2614 includes one or more sensors configured to provide status assessments in various aspects for the device 2600. For instance, the sensor component 2614 may detect an on/off status of the device 2600 and relative positioning of components, such as a display and small keyboard of the device 2600, and the sensor component 2614 may further detect a change in a position of the device 2600 or a component of the device 2600, presence or absence of contact between the user and the device 2600, orientation or acceleration/deceleration of the device 2600 and a change in temperature of the device 2600. The sensor component 2614 may include a proximity sensor configured to detect presence of an object nearby without any physical contact. The sensor component 2614 may also include a light sensor, such as a complementary metal oxide semiconductor (CMOS) or charge coupled device (CCD) image sensor, configured for use in an imaging application. In some embodiments, the sensor component 2614 may also include an acceleration sensor, a gyroscope sensor, a magnetic sensor, a pressure sensor or a temperature sensor.

The communication component 2616 is configured to facilitate wired or wireless communication between the device 2600 and other devices. The device 2600 may access a communication-standard-based wireless network, such as a wireless fidelity (Wi-Fi) network, a 2nd-generation (2G) or 3rd-generation (3G) network, a 4th-generation (4G) network, an LTE network, a 5G network or a combination thereof. In an exemplary embodiment, the communication component 2616 receives a broadcast signal or broadcast associated information from an external broadcast management system through a broadcast channel In an exemplary embodiment, the communication component 2616 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 2600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above methods.

In an exemplary embodiment, there is also provided a non-transitory computer-readable storage medium including instructions, such as included in the memory 2604, executable by the processor 2620 of the device 2600 for performing the method for controlling uplink transmission power as illustrated in any one of FIG. 10 and FIG. 11. For example, the non-transitory computer-readable storage medium may be a ROM, a RAM, a CD-ROM, a magnetic tape, a floppy disc, an optical data storage device, and the like.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for controlling uplink transmission power, performed by a base station, comprising:
    determining an uplink resource ratio of user equipment (UE) in a preset high-power mode;
    determining, in response to the uplink resource ratio being greater than or equal to a preset uplink proportion threshold corresponding to the preset high-power mode, power adjustment information; and
    sending the uplink resource ratio and the power adjustment information to the UE so that the UE controls uplink transmission power according to the power adjustment information in transmitting uplink information according to the uplink resource ratio in the preset high-power mode;
    wherein the determining the uplink resource ratio of the UE in the preset high-power mode comprises:
    determining whether the UE supports a preset power adjustment function, the preset power adjustment function being configured to avoid exceeding a standard specific absorption rate (SAR) by adjusting the uplink transmission power in response to the uplink resource ratio exceeding the preset uplink proportion threshold corresponding to the preset high-power mode; and
    determining, in response to the UE supporting the preset power adjustment function, the uplink resource ratio according to a first uplink proportion threshold corresponding to the preset high-power mode, wherein the first uplink proportion threshold is an uplink proportion threshold corresponding to an upper limit value of SAR;

wherein the determining the power adjustment information comprises:

reducing the uplink transmission power corresponding to the uplink resource ratio according to preset strategies, and obtaining a power adjustment result; and determining the power adjustment information according to the power adjustment result;

wherein the reducing the uplink transmission power corresponding to the uplink resource ratio according to the preset strategies, and obtaining the power adjustment result comprises:

determining an original transmission power value corresponding to the preset high-power mode, wherein the original transmission power value is preset uplink transmission power determined in response to the uplink resource ratio being less than the preset uplink proportion threshold; and determining a power adjustment value corresponding to the uplink resource ratio according to a difference value between the uplink resource ratio and the preset uplink proportion threshold, wherein the power adjustment value is configured to reduce the uplink transmission power based on the original transmission power value;

wherein said determining the power adjustment information according to the power adjustment result comprises:

determining the power adjustment information based on the original transmission power value and the power adjustment value.

2. The method of claim 1, wherein the determining whether the UE supports the preset power adjustment function comprises:

acquiring power control capability information of the UE; and determining whether the UE supports the preset power adjustment function according to the power control capability information.

3. The method of claim 2, wherein the acquiring the power control capability information of the UE comprises:

receiving the power control capability information reported by the UE;

wherein the power control capability information comprises at least one of: a capability indicator indicating whether the preset power adjustment function is supported, or the preset uplink proportion threshold corresponding to the preset high-power mode.

4. The method of claim 1, wherein the determining the uplink resource ratio according to the first uplink proportion threshold corresponding to the preset high-power mode comprises:

determining a power margin according to maximum transmission power of the UE in the preset high-power mode;

determining a configurable maximum uplink proportion based on the power margin; and determining an uplink proportion higher than the first uplink proportion threshold as the uplink resource ratio, wherein the uplink resource ratio does not exceed the maximum uplink proportion.

5. The method of claim 1, wherein the preset strategies comprise at least one of:

reducing maximum transmission power corresponding to the preset high-power mode;

reducing nominal power corresponding to the preset high-power mode;

reducing a path compensation value of a cell;

reducing a modulation and coding scheme (MCS) adjustment value determined by an MCS and a data type; or reducing an adjustment value formed by closed-loop power control of the UE.

6. The method of claim 5, wherein reducing the maximum transmission power corresponding to the preset high-power mode comprises:

reducing the maximum transmission power corresponding to the preset high-power mode according to an adjustment value determined by a preset maximum power reduction (MPR).

7. The method of claim 1, wherein the power adjustment value comprises:

a power reduction of target uplink transmission power relative to the original transmission power value; or a power adjustment factor for reducing the uplink transmission power.

8. The method of claim 1, wherein the determining the power adjustment value corresponding to the uplink resource ratio according to the difference value between the uplink resource ratio and the preset uplink proportion threshold comprises:

determining the difference value between the uplink resource ratio and the preset uplink proportion threshold; and querying a preset power control list according to the difference value to obtain the power adjustment value corresponding to the difference value, wherein the preset power control list comprises a corresponding relationship between a range of the difference value and the power adjustment value.

9. The method of claim 1, wherein in response to the preset uplink proportion threshold being less than a first uplink proportion threshold, the first uplink proportion threshold is an uplink proportion threshold corresponding to an upper limit value of SAR;

wherein determining the power adjustment value corresponding to the uplink resource ratio comprises:

determining whether the uplink resource ratio is greater than the first uplink proportion threshold;

determining, in response to the uplink resource ratio being less than the first uplink proportion threshold, a first adjustment value; and determining, in response to the uplink resource ratio being greater than or equal to the first uplink proportion threshold, a second adjustment value, wherein a power reduction determined by the second adjustment value is not less than a power reduction determined by the first adjustment value.

10. A base station implementing operations of the method for controlling uplink transmission power of claim 1, comprising:

a processor; and memory configured to store instructions executable by the processor;

wherein the processor is configured to:

determine an uplink resource ratio of user equipment (UE) in a preset high-power mode;

determine, in response to the uplink resource ratio being greater than or equal to a preset uplink proportion threshold corresponding to the preset high-power mode, power adjustment information;

send the uplink resource ratio and the power adjustment information to the UE so that the UE controls uplink transmission power according to the power adjustment information in transmitting uplink information according to the uplink resource ratio in the preset high-power mode;

determine whether the UE supports a preset power adjustment function, the preset power adjustment function being configured to avoid exceeding a standard specific absorption rate (SAR) by adjusting the uplink transmission power in response to the uplink resource ratio exceeding the preset uplink proportion threshold corresponding to the preset high-power mode; and determine, in response to the UE supporting the preset power adjustment function, the uplink resource ratio according to a first uplink proportion threshold corresponding to the preset high-power mode, wherein the first uplink proportion threshold is an uplink proportion threshold corresponding to an upper limit value of SAR;

wherein the processor is further configured, in response to determining the power adjustment information, to:

determine an original transmission power value corresponding to the preset high-power mode, wherein the original transmission power value is preset uplink transmission power determined in response to the uplink resource ratio being less than the preset uplink proportion threshold;

determine a power adjustment value corresponding to the uplink resource ratio according to a difference value between the uplink resource ratio and the preset uplink proportion threshold, wherein the power adjustment value is configured to reduce the uplink transmission power based on the original transmission power value; and determine the power adjustment information based on the original transmission power value and the power adjustment value.

11. A method for controlling uplink transmission power, performed by user equipment (UE), comprising:

reporting power control capability information to a base station, wherein the power control capability information is configured to indicate whether the UE supports a preset power adjustment function, and the preset power adjustment function is configured to avoid exceeding a standard specific absorption rate (SAR) by adjusting uplink transmission power in response to an uplink resource ratio exceeding a preset uplink proportion threshold corresponding to a preset high-power mode;

receiving the uplink resource ratio and power adjustment information in the preset high-power mode which are sent by the base station, wherein the uplink resource ratio is higher than the preset uplink proportion threshold; and controlling the uplink transmission power according to the power adjustment information in transmitting uplink information according to the uplink resource ratio in the preset high-power mode;

wherein the power adjustment information comprises: an original transmission power value and a power adjustment value;

wherein said controlling the uplink transmission power according to the power adjustment information comprises:

determining target uplink transmission power according to the original transmission power value and the power adjustment value; and transmitting the uplink information according to the target uplink transmission power.

12. The method of claim 11, wherein the power control capability information comprises at least one of: a capability indicator indicating whether the preset power adjustment function is supported, or the preset uplink proportion threshold corresponding to the preset high-power mode.

13. The method of claim 11, wherein the power adjustment value is a preset power reduction;

wherein determining the target uplink transmission power comprises:

reducing the original transmission power value by the preset power reduction to obtain the target uplink transmission power.

14. The method of claim 11, wherein the power adjustment value is a preset power adjustment factor for reducing the uplink transmission power;

wherein determining the target uplink transmission power comprises:

determining the target uplink transmission power according to the product of the original transmission power value and the preset power adjustment factor.

15. User equipment (UE), comprising:

a processor; and memory configured to store instructions executable by the processor;

wherein the processor is configured to:

report power control capability information to a base station, wherein the power control capability information is configured to indicate whether the UE supports a preset power adjustment function, and the preset power adjustment function is configured to avoid exceeding a standard specific absorption rate (SAR) by adjusting uplink transmission power in response to an uplink resource ratio exceeding a preset uplink proportion threshold corresponding to a preset high-power mode;

receive the uplink resource ratio and power adjustment information in the preset high-power mode which are sent by the base station, wherein the uplink resource ratio is higher than the preset uplink proportion threshold; and control the uplink transmission power according to the power adjustment information in transmitting uplink information according to the uplink resource ratio in the preset high-power mode;

wherein the power adjustment information comprises: an original transmission power value and a power adjustment value; and the processor is further configured, in response to controlling the uplink transmission power according to the power adjustment information, to:

determine target uplink transmission power according to the original transmission power value and the power adjustment value; and transmit the uplink information according to the target uplink transmission power.

* * * * *